United States Patent
Li

(10) Patent No.: US 10,324,613 B2
(45) Date of Patent: Jun. 18, 2019

(54) METHOD AND ELECTRONIC DEVICE FOR MOVING ICON TO PAGE

(71) Applicant: Huawei Technologies Co., Ltd., Shenzhen (CN)

(72) Inventor: Jianhua Li, Shenzhen (CN)

(73) Assignee: HUAWEI TECHNOLOGIES CO, LTD., Shenzhen (CN)

(*) Notice: Subject to any disclaimer, the term of this patent is extended or adjusted under 35 U.S.C. 154(b) by 855 days.

(21) Appl. No.: 14/880,585

(22) Filed: Oct. 12, 2015

(65) Prior Publication Data

US 2016/0034130 A1 Feb. 4, 2016

Related U.S. Application Data

(63) Continuation of application No. PCT/CN2014/079977, filed on Jun. 16, 2014.

(51) Int. Cl.
| | |
|---|---|
| *G06F 9/48* | (2006.01) |
| *G06F 3/0486* | (2013.01) |
| *G06F 3/0483* | (2013.01) |
| *G06F 3/0481* | (2013.01) |
| *G06F 3/0484* | (2013.01) |

(52) U.S. Cl.
CPC .......... *G06F 3/0486* (2013.01); *G06F 3/0483* (2013.01); *G06F 3/04817* (2013.01); *G06F 3/04845* (2013.01)

(58) Field of Classification Search
CPC .. G06F 3/0486; G06F 3/04817; G06F 3/0483; G06F 3/04845
See application file for complete search history.

(56) References Cited

U.S. PATENT DOCUMENTS

| | | | |
|---|---|---|---|
| 7,434,177 B1* | 10/2008 | Ording | G06F 3/04842 |
| | | | 715/862 |
| 2006/0155684 A1* | 7/2006 | Liu | G06F 17/30274 |

(Continued)

FOREIGN PATENT DOCUMENTS

| | | |
|---|---|---|
| CN | 101957718 A | 1/2011 |
| CN | 102236516 A | 11/2011 |

(Continued)

OTHER PUBLICATIONS

Chris Coyier, "Draggable Elements That Push Others Out Of Way", Feb. 7, 2014 [online], [retrieved on Jul. 23, 2018]. Retrieved from the Internet: <URL:https://web.archive.org/web/20140208070426/https://css-tricks.com/draggable-elements-push-others-way/>, 10 pages. (Year: 2014).*

(Continued)

*Primary Examiner* — Jennifer N To
*Assistant Examiner* — K C Chen
(74) *Attorney, Agent, or Firm* — Conley Rose, P.C.

(57) ABSTRACT

A method and an apparatus for moving an icon and an electronic device, and are related to the field of terminal technologies, where the method includes acquiring an icon position of a selected icon on a display interface, when the icon position is in a predetermined area, determining, according to the icon position, a navigation point matching the icon position, where the predetermined area includes n navigation points, each navigation point is corresponding to one page, and n≥2, and moving the icon to a page that is corresponding to the navigation point matching the icon position. According to the present disclosure, a problem, in the method for moving an icon involved in the background, that an operation is relatively complex and operating efficiency is relatively low when cross-page moving is performed on an icon is solved.

24 Claims, 11 Drawing Sheets

(56) References Cited

U.S. PATENT DOCUMENTS

| | | |
|---|---|---|
| 2011/0271182 A1 | 11/2011 | Tsai et al. |
| 2012/0084692 A1 | 4/2012 | Bae |
| 2012/0188275 A1 | 7/2012 | Shimazu et al. |
| 2013/0007666 A1 | 1/2013 | Song et al. |

FOREIGN PATENT DOCUMENTS

| | | | | |
|---|---|---|---|---|
| CN | 103076947 A | | 5/2013 | |
| CN | 103092469 A | * | 5/2013 | ........... G06F 3/0481 |
| CN | 103092469 A | | 5/2013 | |
| CN | 103324404 A | | 9/2013 | |
| TW | 201137724 A | | 11/2011 | |

OTHER PUBLICATIONS

"Euclidean distance", Dec. 6, 2013, Wikipedia [online], [retrieved on Jul. 25, 2018]. Retrieved from the Internet: <URL:https://web.archive.org/web/20131206042833/https://en.wikipedia.org/wiki/Euclidean_distance>, 3 pages. (Year: 2013).*

Foreign Communication From A Counterpart Application, European Application No. 14880384.4, Extended European Search Report dated Dec. 17, 2015, 8 pages.

Partial English Translation and Abstract of Chinese Patent Application No. CN102236516, Jul. 30, 2015, 3 pages.

Partial English Translation and Abstract of Chinese Patent Application No. CN103092469, Jul. 30, 2015, 6 pages.

Partial English Translation and Abstract of Chinese Patent Application No. CN103324404, Jul. 30, 2015, 5 pages.

Partial English Translation and Abstract of Taiwanese Patent Application No. TW201137724, Jul. 30, 2015, 7 pages.

Foreign Communication From A Counterpart Application, PCT Application No. PCT/CN2014/079977, International Search Report dated Feb. 26, 2015, 8 pages.

Foreign Communication From A Counterpart Application, PCT Application No. PCT/CN2014/079977, Written Opinion dated Feb. 26, 2015, 5 pages.

Foreign Communication From A Counterpart Application, Chinese Application No. 201480001365.4, Chinese Office Action dated Oct. 9, 2016, 8 pages.

* cited by examiner

METHOD AND ELECTRONIC DEVICE FOR MOVING ICON TO PAGE

CROSS REFERENCE

This application is a continuation of International Application No. PCT/CN2014/079977, filed on Jun. 16, 2014, which is hereby incorporated by reference in its entirety.

TECHNICAL FIELD

The present disclosure relates to the field of terminal technologies, and in particular, to a method and an apparatus for moving an icon, and an electronic device.

BACKGROUND

With popularization of electronic devices such as a smartphone, a tablet computer, and a smart television, applications that are applicable to these electronic devices also gradually increase.

Generally, in an electronic device, multiple pages need to be used to place various application icons, and multiple icons may be placed on each page. A user may drag each icon as required to change a page on which the icon is placed, or change a position of the icon on the page. When the user moves an icon from one page to another page, a related method for moving an icon is as follows. The user touches and holds a to-be-moved icon and drags the icon to a screen edge, so that the current page is switched; and when the current page is switched to a target page, the user releases the icon at a target position of the target page, so as to implement cross-page moving of the icon.

In a process of implementing the present disclosure, the inventor finds that the foregoing art has at least the following problems: when cross-page moving is performed on an icon, an operation is relatively complex and it takes relatively long time to wait for page switching, which causes relatively low operating efficiency.

SUMMARY

To resolve a problem that an operation is relatively complex and operating efficiency is relatively low when cross-page moving is performed on an icon by using the method for moving an icon involved in the foregoing art, embodiments of the present disclosure provide a method and an apparatus for moving an icon, and an electronic device. The technical solutions are as follows. According to a first aspect, a method for moving an icon is provided, where the method includes acquiring an icon position of a selected icon on a display interface, when the icon position is in a predetermined area, determining, according to the icon position, a navigation point matching the icon position, where the predetermined area includes n navigation points, each navigation point is corresponding to one page, and n≥2, and moving the icon to a page that is corresponding to the navigation point matching the icon position.

In a first possible implementation manner of the first aspect, the determining, according to the icon position, a navigation point matching the icon position includes when the n navigation points are arranged along a straight line, calculating projection distances between the navigation points and the icon position on the straight line, where a projection distance between the ith navigation point and the icon position on the straight line is $l_i=|x_i-x_t|$, where $x_i$ represents projection coordinates of the ith navigation point on the straight line, $x_t$ represents projection coordinates of the icon position on the straight line, and $1\leq i\leq n$, and selecting a navigation point with a smallest projection distance from the icon position on the straight line as the navigation point matching the icon position.

With reference to the first aspect or the first possible implementation manner of the first aspect, in a second possible implementation manner of the first aspect, before the acquiring an icon position of a selected icon on a display interface, the method further includes receiving a selection signal corresponding to the icon, scaling up a distance between two neighboring navigation points among the n navigation points after the selection signal is received, and displaying the n navigation points after the distance is scaled up.

With reference to the first aspect, the first possible implementation manner of the first aspect, or the second possible implementation manner of the first aspect, in a third possible implementation manner of the first aspect, the method further includes when the icon position is in the predetermined area, displaying the icon and the n navigation points in a predetermined effect, where the predetermined effect refers to that a distance between two navigation points closest to the icon position is greater than a width of the icon.

With reference to the third possible implementation manner of the first aspect, in a fourth possible implementation manner of the first aspect, the displaying the icon and the n navigation points in a predetermined effect includes performing scaling, for display, on the width of the icon according to the distance between the two navigation points closest to the icon position, and/or, performing scaling, for display, on the distance between the two navigation points closest to the icon position according to the width of the icon.

With reference to the fourth possible implementation manner of the first aspect, in a fifth possible implementation manner of the first aspect, the performing scaling, for display, on the distance between the two navigation points closest to the icon position according to the width of the icon includes updating coordinates of each navigation point by using a predetermined algorithm, and displaying the n navigation points in a fisheye effect according to updated coordinates of each navigation point, where the fisheye effect refers to that the distance between two neighboring navigation points is in a negative correlation to proximity between the two neighboring navigation points and the icon position.

With reference to the fifth possible implementation manner of the first aspect, in a sixth possible implementation manner of the first aspect, the updating coordinates of each navigation point by using a predetermined algorithm includes when the n navigation points are arranged along a straight line, for each navigation point, acquiring a difference between projection coordinates of the navigation point and the icon position on the straight line, where a difference between projection coordinates of the ith navigation point and the icon position on the straight line is $d_i=x_i-x_t$, where $x_i$ represents the projection coordinates of the ith navigation point on the straight line, $x_t$ represents the projection coordinates of the icon position on the straight line, and $1\leq i\leq n$, calculating a first percentage value corresponding to the navigation point, where a first percentage value corresponding to the ith navigation point is $P_i=d_i\hat{\,}c$, where c is a preset constant, and $0<1<c$, and updating the projection coordinates of the navigation point on the straight line according to the first percentage value, where updated projection coordinates of the ith navigation point on the straight line are $$X_i = x_t + \frac{L}{|P_1| + |P_n|} \times P_i,$$

where L is a preset constant, and L>0.

With reference to the fifth possible implementation manner of the first aspect, in a seventh possible implementation manner of the first aspect, the updating coordinates of each navigation point by using a predetermined algorithm includes when the n navigation points are arranged along a straight line, for each navigation point, calculating a second percentage value corresponding to the navigation point, where a second percentage value corresponding to the ith navigation point is $f(i)=f(t) \times q^{|i-t|}$, where the tth navigation point refers to either of the two navigation points closest to the icon position and the either one is closest to the first navigation point, $1 \leq i \leq n$, $1 \leq t \leq n-1$, and q is a preset constant and $0<q<1$, and updating projection coordinates of the navigation point on the straight line according to the second percentage value, where updated projection coordinates of the ith navigation point on the straight line are $$X_i = x_0 + \sum_{i=1}^{i-1} f(i) \times \frac{L}{\sum_{i=1}^{n-1} f(i)},$$

where L is a preset constant and L>0, and x0 is a preset constant and $x0 \geq 0$.

With reference to the fifth possible implementation manner of the first aspect, in an eighth possible implementation manner of the first aspect, the updating coordinates of each navigation point by using a predetermined algorithm includes when the n navigation points are arranged along a straight line, scaling a distance b between two navigation points closest to the icon position to w according to a width k of the icon, where w>k, b>0, the two navigation points closest to the icon position are the tth navigation point and the (t+1)th navigation point, and $1 \leq t \leq n-1$, for the ith navigation point, calculating a distance between the ith navigation point and the (i+1)th navigation point, $D(i)=w+d \times |i-t|$, where $$\sum_{i=1}^{n-1} D(i) = L,$$

L is a preset constant and L>0, $1 \leq i \leq n-1$, and d is a preset constant and d<0, and updating projection coordinates of each navigation point on the straight line according to the distance that is between the ith navigation point and the (i+1)th navigation point and obtained by calculation.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner of the first aspect, the moving the icon to a page that is corresponding to the navigation point matching the icon position includes displaying the page that is corresponding to the navigation point matching the icon position, and when the icon is dragged to a target position of the page and is released, displaying the icon at the target position of the page.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a tenth possible implementation manner of the first aspect, the moving the icon to a page that is corresponding to the navigation point matching the icon position includes detecting whether a vacant position that is used to display the icon exists on the page that is corresponding to the navigation point matching the icon position, and if the vacant position exists, moving and displaying the icon at the vacant position.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in an eleventh possible implementation manner of the first aspect, before the moving the icon to a page that is corresponding to the navigation point matching the icon position, the method further includes acquiring stay duration for which the icon position has been in the predetermined area, detecting whether the stay duration is greater than a predetermined threshold, and if the stay duration is greater than the predetermined threshold, executing the step of moving the icon to a page that is corresponding to the navigation point matching the icon position.

According to a second aspect, an apparatus for moving an icon is provided, where the apparatus includes an acquiring module configured to acquire an icon position of a selected icon on a display interface, a determining module configured to, when the icon position acquired by the acquiring module is in a predetermined area, determine, according to the icon position, a navigation point matching the icon position, where the predetermined area includes n navigation points, each navigation point is corresponding to one page, and $n \geq 2$, and a moving module configured to, after the determining module determines the navigation point matching the icon position, move the icon to a page that is corresponding to the navigation point matching the icon position.

In a first possible implementation manner of the second aspect, the determining module includes a calculating submodule and a selecting submodule, where the calculating submodule is configured to, when the n navigation points are arranged along a straight line, calculate projection distances between the navigation points and the icon position on the straight line, where a projection distance between the ith navigation point and the icon position on the straight line is $li=|xi-xt|$, where xi represents projection coordinates of the ith navigation point on the straight line, xt represents projection coordinates of the icon position on the straight line, and $1 \leq i \leq n$, and the selecting submodule is configured to, after the calculating submodule obtains the projection distances between the navigation points and the icon position on the straight line by calculation, select a navigation point with a smallest projection distance from the icon position on the straight line as the navigation point matching the icon position.

With reference to the second aspect or the first possible implementation manner of the second aspect, in a second possible implementation manner of the second aspect, the apparatus further includes a receiving module configured to receive a selection signal corresponding to the icon, a scale-up module configured to scale up a distance between two neighboring navigation points among the n navigation points after the receiving module receives the selection signal, and a first display module configured to display the n navigation points after the distance is scaled up by the scale-up module.

With reference to the second aspect, the first possible implementation manner of the second aspect, or the second possible implementation manner of the second aspect, in a third possible implementation manner of the second aspect, the method further includes a second display module configured to, when the icon position is in the predetermined area, display the icon and the n navigation points in a predetermined effect, where the predetermined effect refers to that a distance between two navigation points closest to the icon position is greater than a width of the icon.

With reference to the third possible implementation manner of the second aspect, in a fourth possible implementation manner of the second aspect, the second display module includes a first scaling submodule and/or a second scaling submodule, where the first scaling submodule is configured to perform scaling, for display, on the width of the icon according to the distance between the two navigation points closest to the icon position, and the second scaling submodule is configured to perform scaling, for display, on the distance between the two navigation points closest to the icon position according to the width of the icon.

With reference to the fourth possible implementation manner of the second aspect, in a fifth possible implementation manner of the second aspect, the second scaling submodule includes an updating unit and a display unit, where the updating unit is configured to update coordinates of each navigation point by using a predetermined algorithm, and the display unit is configured to, after the updating unit updates the coordinates of each navigation point, display the n navigation points in a fisheye effect according to updated coordinates of each navigation point, where the fisheye effect refers to that the distance between two neighboring navigation points is in a negative correlation to proximity between the two neighboring navigation points and the icon position.

With reference to the fifth possible implementation manner of the second aspect, in a sixth possible implementation manner of the second aspect, the updating unit includes a difference acquiring subunit, a first calculating subunit, and a first updating subunit, where the difference acquiring subunit is configured to, when the n navigation points are arranged along a straight line, for each navigation point, acquire a difference between projection coordinates of the navigation point and the icon position on the straight line, where a difference between projection coordinates of the ith navigation point and the icon position on the straight line is $d_i = x_i - x_t$, where $x_i$ represents the projection coordinates of the ith navigation point on the straight line, $x_t$ represents the projection coordinates of the icon position on the straight line, and $1 \leq i \leq n$, the first calculating subunit is configured to calculate a first percentage value corresponding to the navigation point, where a first percentage value corresponding to the ith navigation point is $P_i = d_i \hat{\ } c$, where c is a preset constant, and $0 < 1 < c$, and the first updating subunit is configured to update the projection coordinates of the navigation point on the straight line according to the first percentage value, where updated projection coordinates of the ith navigation point on the straight line are $$X_i = x_t + \frac{L}{|P_1| + |P_n|} \times P_i,$$

where L is a preset constant, and $L>0$.

With reference to the fifth possible implementation manner of the second aspect, in a seventh possible implementation manner of the second aspect, the updating unit includes a second calculating subunit and a second updating subunit, where the second calculating subunit is configured to, when the n navigation points are arranged along a straight line, for each navigation point, calculate a second percentage value corresponding to the navigation point, where a second percentage value corresponding to the ith navigation point is $f(i)=f(t) \times q^{|i-t|}$, where the tth navigation point refers to either of the two navigation points closest to the icon position and the either one is closest to the first navigation point, $1 \leq i \leq n$, $1 \leq t \leq n-1$, and q is a preset constant and $0<q<1$, and the second updating subunit is configured to update projection coordinates of the navigation point on the straight line according to the second percentage value, where updated projection coordinates of the ith navigation point on the straight line are $$X_i = x_0 + \sum_{i=1}^{i-1} f(i) \times \frac{L}{\sum_{i=1}^{n-1} f(i)},$$

where L is a preset constant and $L>0$, and $x_0$ is a preset constant and $x_0 \geq 0$.

With reference to the fifth possible implementation manner of the second aspect, in an eighth possible implementation manner of the second aspect, the updating unit includes a distance scaling subunit, a third calculating subunit, and a third updating subunit, where the distance scaling subunit is configured to, when the n navigation points are arranged along a straight line, scale a distance b between two navigation points closest to the icon position to w according to a width k of the icon, where $w>k$, $b>0$, the two navigation points closest to the icon position are the tth navigation point and the (t+1)th navigation point, and $1 \leq t \leq n-1$, the third calculating subunit is configured to, for the ith navigation point, calculate a distance between the ith navigation point and the (i+1)th navigation point, that is, $D(i)=w+d \times |i-t|$, where $$\sum_{i=1}^{n-1} D(i) = L,$$

L is a preset constant and $L>0$, $1 \leq i \leq n-1$, and d is a preset constant and $d<0$, and the third updating subunit is configured to update projection coordinates of each navigation point on the straight line according to the distance that is between the ith navigation point and the (i+1)th navigation point and obtained by calculation.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner of the second aspect, the moving module includes a page display submodule and an icon display submodule, where the page display submodule is configured to display the page that is corresponding to the navigation point matching the icon position, and the icon display submodule is configured to, when the icon is dragged to a target position of the page displayed by the page display submodule and is released, display the icon at the target position of the page.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a tenth possible implementation manner of the second aspect, the moving module includes a position detecting submodule and an icon moving submodule, where the position detecting submodule is configured to detect whether a vacant position that is used to display the icon exists on the page that is corresponding to the navigation point matching the icon position, and the icon moving submodule is configured to, when the position detecting submodule detects that the vacant position exists, move and display the icon at the vacant position.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in an eleventh possible implementation manner of the second aspect, the apparatus further includes a duration acquiring module configured to acquire stay duration for which the icon position has been in the predetermined area, and a duration detecting module configured to detect whether the stay duration acquired by the duration acquiring module is greater than a predetermined threshold; where the moving module is further configured to, when the duration detecting module detects that the stay duration is greater than the predetermined threshold, move the icon to the page that is corresponding to the navigation point matching the icon position.

According to a third aspect, an electronic device is provided, where the electronic device includes a processor, a memory, and an output device, where the processor is connected to the output device, and the processor is connected to the memory, where the processor is configured to acquire an icon position of a selected icon on a display interface that is output by the output device, the processor is further configured to, when the icon position is in a predetermined area, determine, according to the icon position, a navigation point matching the icon position, where the predetermined area includes n navigation points, each navigation point is corresponding to one page, and n≥2, and the processor is further configured to move the icon to a page that is corresponding to the navigation point matching the icon position.

In a first possible implementation manner of the third aspect, the processor is further configured to, when the n navigation points are arranged along a straight line, calculate projection distances between the navigation points and the icon position on the straight line, where a projection distance between the $i^{th}$ navigation point and the icon position on the straight line is $l_i=|x_i-x_t|$, where $x_i$ represents projection coordinates of the $i^{th}$ navigation point on the straight line, $x_t$ represents projection coordinates of the icon position on the straight line, and $1 \le i \le n$, and the processor is further configured to select a navigation point with a smallest projection distance from the icon position on the straight line as the navigation point matching the icon position.

With reference to the third aspect or the first possible implementation manner of the third aspect, in a second possible implementation manner of the first aspect, the processor is further configured to receive a selection signal corresponding to the icon, the processor is further configured to scale up a distance between two neighboring navigation points among the n navigation points after the selection signal is received, and the processor is further configured to control the output device to display the n navigation points after the distance is scaled up.

With reference to the third aspect, the first possible implementation manner of the third aspect, or the second possible implementation manner of the third aspect, in a third possible implementation manner of the third aspect, the processor is further configured to, when the icon position is in the predetermined area, control the output device to display the icon and the n navigation points in a predetermined effect, where the predetermined effect refers to that a distance between two navigation points closest to the icon position is greater than a width of the icon.

With reference to the third possible implementation manner of the third aspect, in a fourth possible implementation manner of the third aspect, the processor is further configured to, after scaling is performed on the width of the icon according to the distance between the two navigation points closest to the icon position, control the output device to perform display, and/or, the processor is further configured to, after scaling is performed on the distance between the two navigation points closest to the icon position according to the width of the icon, control the output device to perform display.

With reference to the fourth possible implementation manner of the third aspect, in a fifth possible implementation manner of the third aspect, the processor is further configured to update coordinates of each navigation point by using a predetermined algorithm, and the processor is further configured to control the output device to display the n navigation points in a fisheye effect according to updated coordinates of each navigation point, where the fisheye effect refers to that the distance between two neighboring navigation points is in a negative correlation to proximity between the two neighboring navigation points and the icon position.

With reference to the fifth possible implementation manner of the third aspect, in a sixth possible implementation manner of the third aspect, the processor is further configured to, when the n navigation points are arranged along a straight line, for each navigation point, acquire a difference between projection coordinates of the navigation point and the icon position on the straight line, where a difference between projection coordinates of the $i^{th}$ navigation point and the icon position on the straight line is $d_i=x_i-x_t$, where $x_i$ represents the projection coordinates of the $i^{th}$ navigation point on the straight line, $x_t$ represents the projection coordinates of the icon position on the straight line, and $1 \le i \le n$, the processor is further configured to calculate a first percentage value corresponding to the navigation point, where a first percentage value corresponding to the $i^{th}$ navigation point is $P_i=d_i\hat{\ }c$, where c is a preset constant, and $0<1<c$, and the processor is further configured to update the projection coordinates of the navigation point on the straight line according to the first percentage value, where updated projection coordinates of the $i^{th}$ navigation point on the straight line are $$X_i = x_t + \frac{L}{|P_1| + |P_n|} \times P_i,$$

where L is a preset constant, and L>0.

With reference to the fifth possible implementation manner of the third aspect, in a seventh possible implementation manner of the third aspect, the processor is further configured to, when the n navigation points are arranged along a straight line, for each navigation point, calculate a second percentage value corresponding to the navigation point, where a second percentage value corresponding to the $i^{th}$ navigation point is $f(i)=f(t) \times q^{|i-t|}$, where the $t^{th}$ navigation point refers to either of the two navigation points closest to the icon position and the either one is closest to the first navigation point, $1 \le i \le n$, $1 \le t \le n-1$, and q is a preset constant and $0<q<1$, and the processor is further configured to update projection coordinates of the navigation point on the straight line according to the second percentage value, where updated projection coordinates of the $i^{th}$ navigation point on the straight line are $$X_i = x_0 + \sum_{i=1}^{i-1} f(i) \times \frac{L}{\sum_{i=1}^{n-1} f(i)},$$

where L is a preset constant and L>0, and $x_0$ is a preset constant and $x_0 \ge 0$.

With reference to the fifth possible implementation manner of the third aspect, in an eighth possible implementation manner of the third aspect, the processor is further configured to, when the n navigation points are arranged along a straight line, scale a distance b between two navigation points closest to the icon position to w according to a width k of the icon, where w>k, b>0, the two navigation points closest to the icon position are the $t^{th}$ navigation point and the $(t+1)^{th}$ navigation point, and $1 \le t \le n-1$, the processor is further configured to, for the $i^{th}$ navigation point, calculate a distance between the $i^{th}$ navigation point and the $(i+1)^{th}$ navigation point, that is, $D(i)=w+d\times|i-t|$, where $$\sum_{i=1}^{n-1} D(i) = L,$$

L is a preset constant and L>0, $1 \le i \le n-1$, and d is a preset constant and d<0, and the processor is further configured to update projection coordinates of each navigation point on the straight line according to the distance that is between the $i^{th}$ navigation point and the $(i+1)^{th}$ navigation point and obtained by calculation.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a ninth possible implementation manner of the third aspect, the processor is further configured to control the output device to display the page that is corresponding to the navigation point matching the icon position, and the processor is further configured to, when the icon is dragged to a target position of the page and is released, control the output device to display the icon at the target position of the page.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a tenth possible implementation manner of the third aspect, the processor is further configured to detect whether a vacant position that is used to display the icon exists on the page that is corresponding to the navigation point matching the icon position, and the processor is further configured to, if the vacant position exists, move the icon and control the output device to display the icon at the vacant position.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in an eleventh possible implementation manner of the third aspect, the processor is further configured to acquire stay duration for which the icon position has been in the predetermined area, the processor is further configured to detect whether the stay duration is greater than a predetermined threshold, and the processor is further configured to, if the stay duration is greater than the predetermined threshold, move the icon to the page that is corresponding to the navigation point matching the icon position.

According to a fourth aspect, a graphical user interface is provided, where the graphical user interface is disposed on an electronic device; the electronic device includes a display, a touch-sensitive surface, a memory, and one or more processors that are configured to execute one or more programs stored in the memory; and the graphical user interface includes a selected icon and n navigation points, where an icon position of the selected icon on a display interface is acquired, when the icon position is in a predetermined area, a navigation point matching the icon position is acquired, where the predetermined area includes n navigation points, each navigation point is corresponding to one page, and n≥2, and the selected icon is moved to a page that is corresponding to the navigation point matching the icon position.

Beneficial effects of the technical solutions provided in the embodiments of the present disclosure are as follows An icon position of a selected icon on a display interface is acquired; when the icon position is in a predetermined area, a navigation point matching the icon position is determined according to the icon position; and the icon is moved to a page that is corresponding to the navigation point matching the icon position, thereby solving a problem, in the method for moving an icon involved in the Background, that an operation is relatively complex and operating efficiency is relatively low when cross-page moving is performed on an icon, simplifying an operation that is required when cross-page moving is performed on an icon; and fully enhancing the operating efficiency.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

It should be first noted that, in all the embodiments of the present disclosure, an electric device may be a smartphone, a tablet computer, an e-book reader, an Moving Picture Experts Group Audio Layer III (MP3) player, an Moving Picture Experts Group Audio Layer IV (MP4) player, a smart television, and the like.

Figure 1:
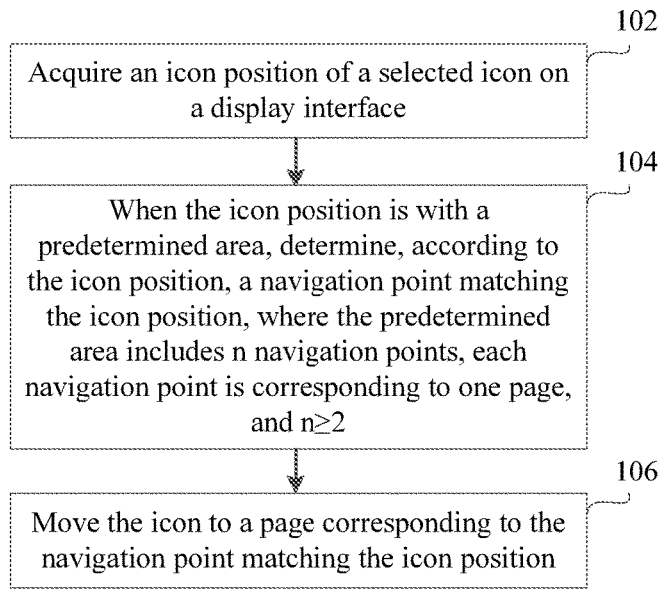
FIG. 1 is a method flowchart of a method for moving an icon according to an embodiment of the present disclosure.

Referring to FIG. 1, FIG. 1 shows a method flowchart of a method for moving an icon according to an embodiment of the present disclosure, and in this embodiment, an example in which the method for moving an icon is applied to an electronic device is used for description. The method for moving an icon may include the following several steps Step 102: Acquire an icon position of a selected icon on a display interface.

Step 104: When the icon position is in a predetermined area, determine, according to the icon position, a navigation point matching the icon position, where the predetermined area includes n navigation points, each navigation point is corresponding to one page, and n≥2.

Step 106: Move the icon to a page that is corresponding to the navigation point matching the icon position.

In conclusion, according to the method for moving an icon provided in this embodiment of the present disclosure, an icon position of a selected icon on a display interface is acquired; when the icon position is in a predetermined area, a navigation point matching the icon position is determined according to the icon position; and then the icon is moved to a page that is corresponding to the navigation point matching the icon position, thereby solving a problem, in the method for moving an icon involved in the Background, that an operation is relatively complex and operating efficiency is relatively low when cross-page moving is performed on an icon, simplifying an operation that is required when cross-page moving is performed on an icon; and fully enhancing the operating efficiency.

Figure 2A:
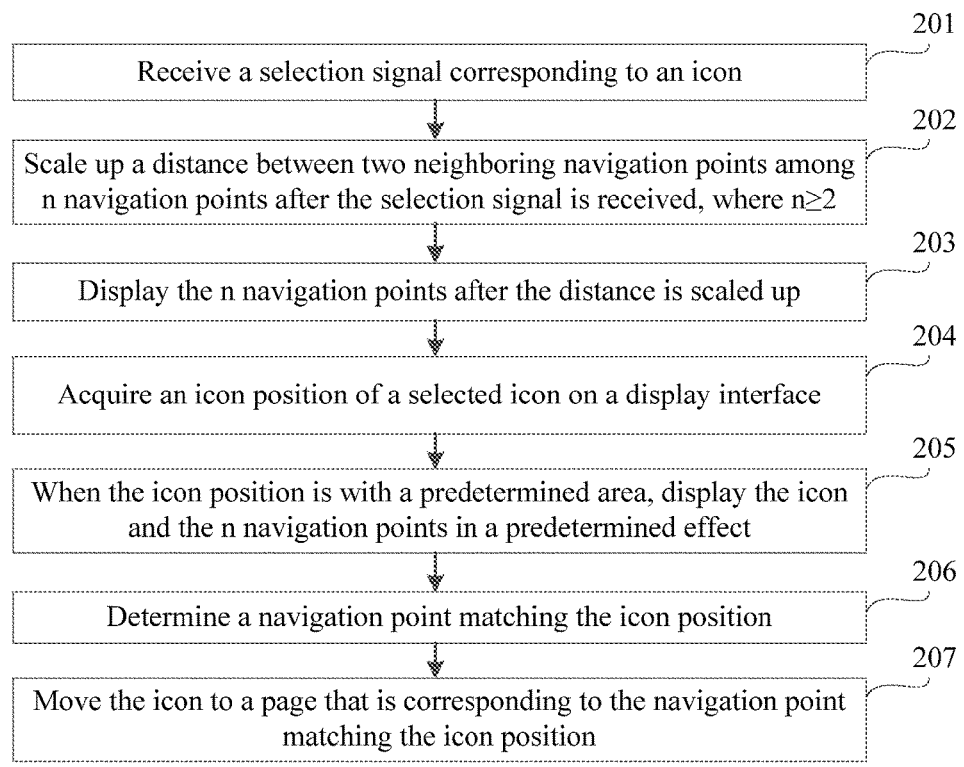
FIG. 2A is a method flowchart of a method for moving an icon according to another embodiment of the present disclosure.

Referring to FIG. 2A, FIG. 2A shows a method flowchart of a method for moving an icon according to another embodiment of the present disclosure. In this embodiment, an example in which the method for moving an icon is applied to an electronic device is used for description. The method for moving an icon may include the following several steps Step 201: Receive a selection signal corresponding to an icon.

When a user needs to move a position of an icon, the user triggers generation of the selection signal to select the to-be-moved icon. For example, the user touches and holds the to-be-moved icon on a touchscreen of the electronic device.

Step 202: Scale up a distance between two neighboring navigation points among n navigation points after the selection signal is received, where n≥2.

A navigation point refers to a guiding signal that is used to differentiate different pages. The different page refers to a page that is used to place various application icons, and one or more icons may be placed on each page. The screen of the electronic device displays the n navigation points, and each navigation point is corresponding to one page. In a normal display status, the n navigation points are sequentially and closely arranged on the screen; that is, the distance between two neighboring navigation points is relatively small.

The electronic device may scale up the distance between two neighboring navigation points according to a predetermined scale factor $\lambda$, where $\lambda>1$. For example, when the n navigation points are arranged along a straight line at equal intervals, assuming that the distance between two neighboring navigation points before being scaled up is a, the distance between two neighboring navigation points after being scaled up is $\lambda \times a$, where $a>0$. For another example, when the n navigation points are arranged in a triangular waveform and all navigation points are sequentially located on crests and valleys of the triangular waveform, assuming that the distance between two neighboring navigation points before being scaled up is a', the distance between two neighboring navigation points after being scaled up is $\lambda \times a'$, where $a'>0$.

Step 203: Display the n navigation points after the distance is scaled up.

Then, the electronic device calculates coordinates of each the navigation point after the distance is scaled up, and displays the n navigation points according to the coordinates obtained by calculation.

Figure 2B:
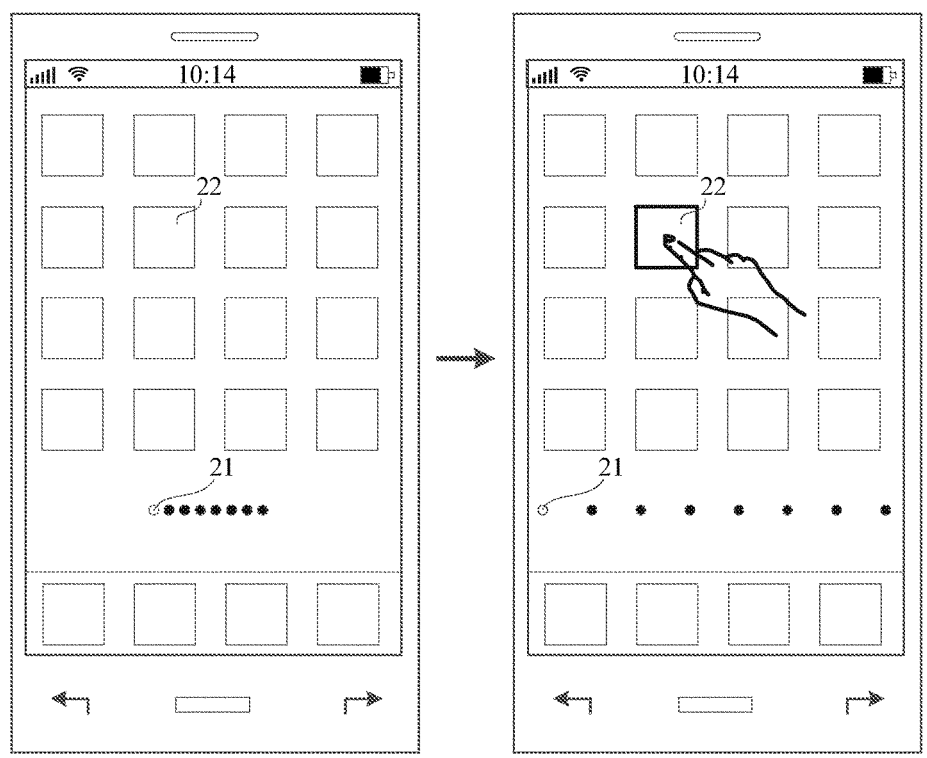
FIG. 2B is a schematic diagram of scaling up and displaying a distance between navigation points according to an embodiment of the present disclosure.

As shown in FIG. 2B, FIG. 2B shows a schematic diagram of scaling up and displaying a distance between navigation points. In a normal display status, the navigation points are sequentially and closely arranged in a horizontal straight line on the bottom of the screen. Assuming that the user needs to move an icon 22 on a page corresponding to the first navigation point 21, the user may touch and hold the icon 22. After receiving the selection signal whose generation is triggered by the user, the electronic device scales up and displays the distance between two neighboring navigation points among all the navigation points.

Figure 2C:
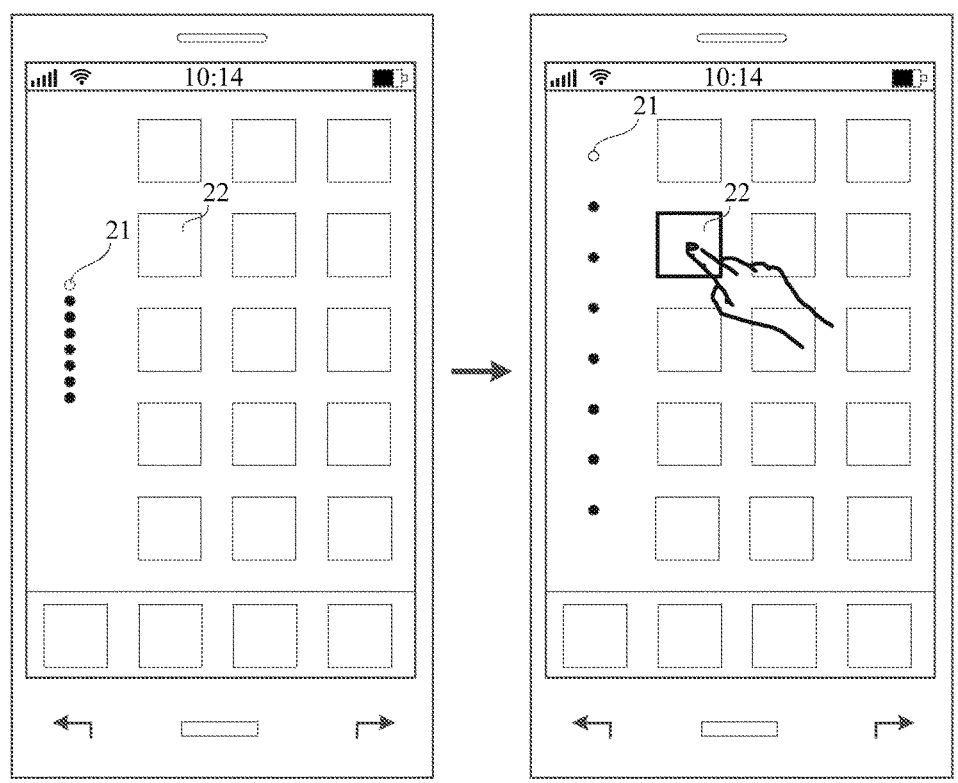
FIG. 2C, FIG. 2D, and FIG. 2E are multiple schematic diagrams of scaling up and displaying a distance between navigation points according to an embodiment of the present disclosure.
Figure 2D:
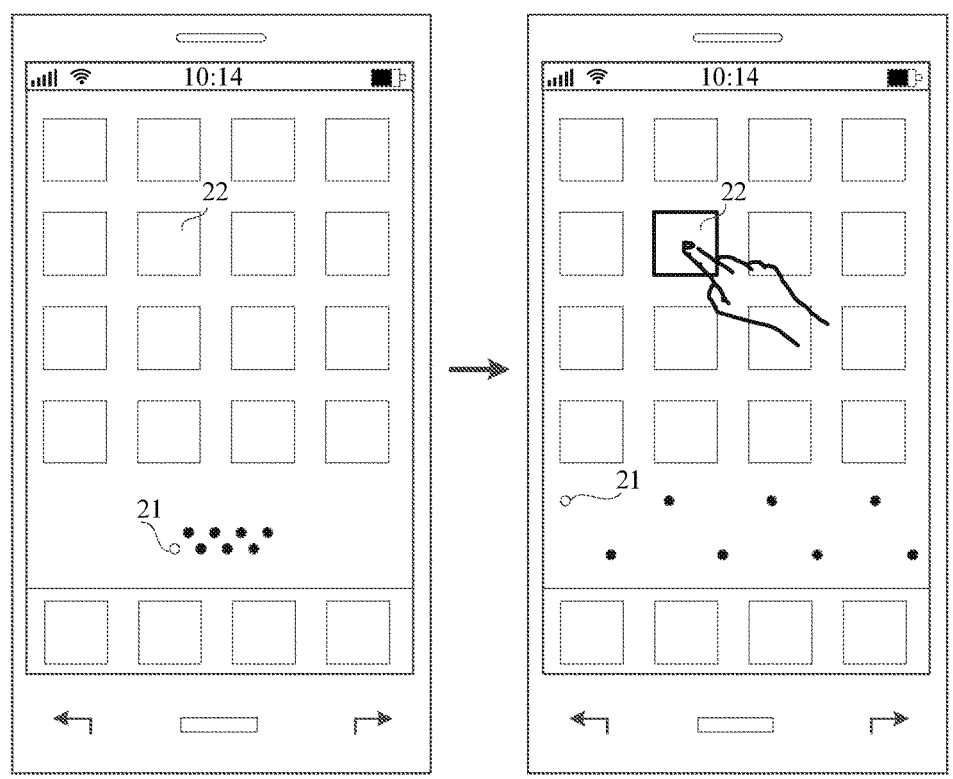
Figure 2E:
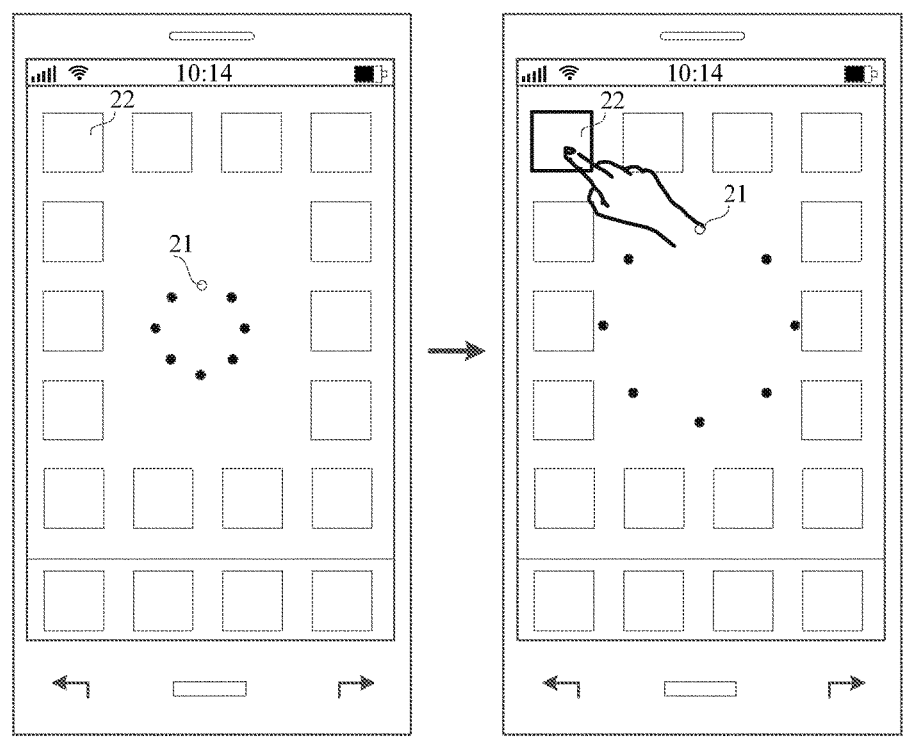

As shown in FIG. 2C, FIG. 2D, and FIG. 2E, FIG. 2C, FIG. 2D, and FIG. 2E show multiple schematic diagrams of scaling up and displaying a distance between navigation points. In FIG. 2C, in a normal display status, the navigation points are sequentially and closely arranged in a vertical straight line on the left of the screen. Assuming that the user needs to move an icon 22 on a page corresponding to the first navigation point 21, the user may touch and hold the icon 22. After receiving the selection signal whose generation is triggered by the user, the electronic device scales up and displays the distance between two neighboring navigation points among all the navigation points.

In FIG. 2D, in a normal display status, the navigation points are sequentially and closely arranged in a triangular waveform on the bottom of the screen. Assuming that the user needs to move an icon 22 on a page corresponding to the first navigation point 21, the user may touch and hold the icon 22. After receiving the selection signal whose generation is triggered by the user, the electronic device scales up and displays the distance between two neighboring navigation points among all the navigation points.

In FIG. 2E, in a normal display status, the navigation points are sequentially and closely arranged in a circle in the middle of the screen. Assuming that the user needs to move an icon 22 on a page corresponding to the first navigation point 21, the user may touch and hold the icon 22. After receiving the selection signal whose generation is triggered by the user, the electronic device scales up and displays the distance between two neighboring navigation points among all the navigation points.

In conclusion, the navigation points may be displayed at any position of the screen of the electronic device in a horizontal straight line, a vertical straight line, a triangular waveform, a rectangle waveform, a sine waveform, a circle, an oval, or another possible form.

A prompt may be sent out to the user by using a change of a distance between the navigation points, to prompt the user to drag a selected icon near the navigation points.

Step 204: Acquire an icon position of a selected icon on a display interface.

The icon position is used to reflect the position of the icon on the display interface that is output by an output device. For example, when the output device is a touchscreen, the icon position may be a position that a finger of the user touches, or may also be a central position of the icon, or any other position of a reference point that can be used to reflect a position change status of the icon. In this embodiment, only an example in which the icon position is a position that a finger of the user touches is used for description, which is not limited.

Optionally, in a process in which the icon is dragged, the icon position of the selected icon on the display interface is acquired.

Step 205: When the icon position is in a predetermined area, display the icon and the n navigation points in a predetermined effect.

One predetermined area is set near the n navigation points, and when the user drags the icon to gradually approach the navigation points, the icon position changes from being outside the predetermined area to being inside the predetermined area. The predetermined area may be considered as a response hot area, and this area is used to respond to some operations of the user. For example, when the user drags the icon into the response hot area, or when the user drags the icon out of the response hot area, the electronic device may respond to the foregoing operations. When the icon position is in the predetermined area, the electronic device displays the icon and the n navigation points in the predetermined effect, where the predetermined effect refers to that a distance between two navigation points closest to the icon position is greater than a width of the icon. After the icon and the n navigation points are displayed in the predetermined effect, it may be ensured that the icon does not block a navigation point, and it may be avoided that a user operation is affected or visual disturbance is brought to the user because the icon blocks a navigation point.

Step 206: Determine a navigation point matching the icon position.

The navigation point matching the icon position is one of the n navigation points. The navigation point matching the icon position also changes as a matching manner varies. For example, the navigation point matching the icon position may be a navigation point that is closest to the icon position; the navigation point matching the icon position may also be a navigation point that is farthest away from the icon position; the navigation point matching the icon position may further be a navigation point with a smallest projection distance from the icon position in a direction; or the navigation point matching the icon position may further be a navigation point with a largest projection distance from the icon position in a direction.

In this embodiment, only an example in which when the n navigation points are arranged along a straight line, the navigation point matching the icon position is a navigation point whose projection distance to the icon position on the straight line is smallest is used for description. Another possible matching manner is not limited in this embodiment.

This step may include the following substeps Firstly, when the n navigation points are arranged along a straight line, calculate projection distances between the navigation points and the icon position on the straight line.

A projection distance between the $i^{th}$ navigation point and the icon position on the straight line is $l_i=|x_i-x_t|$, where $x_i$ represents projection coordinates of the $i^{th}$ navigation point on the straight line, $x_t$ represents projection coordinates of the icon position on the straight line, and $1 \leq i \leq n$.

Secondly, select a navigation point with a smallest projection distance from the icon position on the straight line as the navigation point matching the icon position.

Particularly, when there are two or more navigation points with a smallest projection distance from the icon position on the straight line, the electronic device may randomly select one of the two or more navigation points as the navigation point matching the icon position; or, one of the two or more navigation points is selected, according to a predetermined policy, as the navigation point matching the icon position, where the predetermined policy may be different policies such as selecting a navigation point on the left of the icon position or selecting a navigation point on the right of the icon position.

Step 207: Move the icon to a page that is corresponding to the navigation point matching the icon position.

After the navigation point matching the icon position is determined, the electronic device moves the to-be-moved icon to the page that is corresponding to the navigation point matching the icon position and performs display. The electronic device may move the icon according to a sliding track of the user, and may also automatically move the icon. In a first possible implementation manner, step 207 may include the following several substeps Firstly, display the page that is corresponding to the navigation point matching the icon position.

The user may understand a status of the page by displaying the page that is corresponding to the navigation point matching the icon position. For example, the user may learn which icons exist on the page, whether the page is a target page to which the icon needs to be moved, and whether the page has a vacant position to place the to-be-moved icon.

If the user finds that the page is not the target page, the icon continues to be moved in the predetermined area and the page is finally switched to the target page. Compared with that the user drags the to-be-moved icon to a screen edge and waits for page switching in the background, the icon continues to be moved in the predetermined area to facilitate page switching, so as to fully enhance a page switching speed, enhance operating efficiency, and also avoid some misoperations.

Optionally, in a process in which the user moves the icon in the predetermined area, the page that is corresponding to the navigation point matching the icon position may be directly switched and displayed, and may also be sequentially switched according to a page arranging order and displayed.

Secondly, when the icon is dragged to a target position of the page and is released, display the icon at the target position of the page.

If the user finds that the page is the target page, and that a vacant position exists on the page, the icon is dragged to the target position and the finger is released. The electronic device displays the icon at the target position of the page.

Figure 2F:
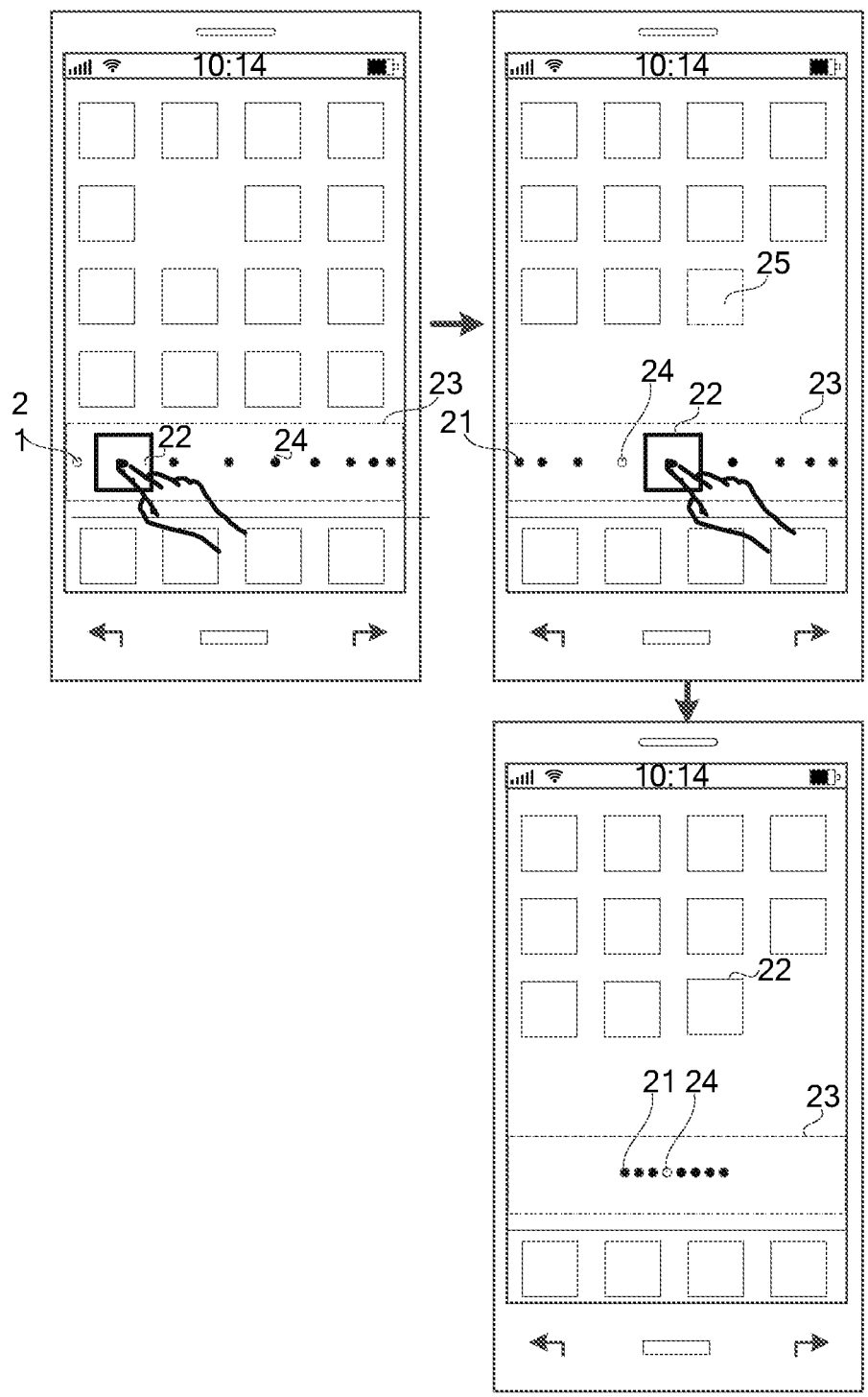
FIG. 2F is a schematic diagram of displaying navigation points in a fisheye effect according to an embodiment of the present disclosure.

As shown in FIG. 2F, when the page is switched to a page corresponding to the fourth navigation point 24, the user may drag the icon 22 to a target position 25 and release the icon 22, the electronic device displays the icon 22 at the target position of the page corresponding to the fourth navigation point 24.

In addition, when the icon is dragged out of the predetermined area, the electronic device scales down the distance between two neighboring navigation points among the n navigation points and the distance between two neighboring navigation points is restored to a normal display status, so as to provide a visual feedback to the user.

In a second possible implementation manner, step 207 may include the following several substeps Firstly, detect whether a vacant position that is used to display the icon exists on the page that is corresponding to the navigation point matching the icon position.

Secondly, if the vacant position exists, move and display the icon at the vacant position.

The electronic device may further automatically detect whether the vacant position that is used to display the icon exists on the page that is corresponding to the navigation point matching the icon position. When the vacant position exists, the icon is automatically moved and displayed at the vacant position. In addition, if the vacant position does not exist, the icon is restored to an original position.

It should be noted that, before the foregoing step 207, the method for moving an icon provided in this embodiment may further include the following several steps 1. Acquire stay duration for which the icon position has been in the predetermined area.

The electronic device records duration from a moment when the icon position enters the predetermined area to a current moment, that is, the stay duration.

2. Detect whether the stay duration is greater than a predetermined threshold.

3. If the stay duration is greater than the predetermined threshold, move the icon to the page that is corresponding to the navigation point matching the icon position.

By detecting the stay duration, the user may be provided with time for selecting the target page, and the electronic device is prevented from automatically moving the icon to a page so rapidly that a misoperation is caused.

In addition, the foregoing step 205 may include the following several implementation manners In a first possible implementation manner, the electronic device may perform scaling, for display, on the width of the icon according to the distance between the two navigation points closest to the icon position. For example, when the width of the icon is greater than the distance between the two navigation points closest to the icon position, the width of the icon is scaled down, so that the width of the icon is smaller than the distance between the two navigation points closest to the icon position.

In a second possible implementation manner, the electronic device may further perform scaling, for display, on the distance between the two navigation points closest to the icon position according to the width of the icon. For example, when the width of the icon is greater than the distance between the two navigation points closest to the icon position, the distance between the two navigation points closest to the icon position is scaled up, so that the width of the icon is less than the distance between the two navigation points closest to the icon position.

Certainly, in another possible implementation manner, the icon and the n navigation points may further be displayed in the predetermined effect in a manner of combining the foregoing two manners.

Optionally, in the foregoing second possible implementation manner, the n navigation points may be displayed in a fisheye effect by adjusting positions of the n navigation points. The fisheye effect refers to a display status in which an object is presented, and the display status is relatively similar to a fisheye.

In this embodiment of the present disclosure, the fisheye effect refers to that the distance between two neighboring navigation points is in a negative correlation to proximity between the two neighboring navigation points and the icon position. That is, when two neighboring navigation points are closer to the icon position, the distance between the two neighboring navigation points is greater; otherwise, when two neighboring navigation points are farther away from the icon position, the distance between the two neighboring navigation points is smaller. In addition, when the user drags and moves the icon in the predetermined area, distances between all the navigation points change as the icon position changes, and the n navigation points are always displayed in the fisheye effect.

As shown in FIG. 2F, FIG. 2F shows a schematic diagram of displaying navigation points in a fisheye effect. When the user drags and moves an icon 22 in a predetermined area 23 from left to right, two navigation points closer to the icon position are in a larger distance, and two navigation points farther to the icon position are in a smaller distance.

The foregoing second possible implementation manner may include the following several substeps Firstly, update coordinates of each navigation point by using a predetermined algorithm.

The predetermined algorithm may be an algorithm based on a parabolic function, an algorithm based on a geometric progression, an algorithm based on an arithmetic progression, or the like. In the following, several specific examples are used to describe different algorithms When the predetermined algorithm is the algorithm based on a parabolic function, this step may include 1. When the n navigation points are arranged along a straight line, for each navigation point, acquire a difference between projection coordinates of the navigation point and the icon position on the straight line.

A difference between projection coordinates of the $i^{th}$ navigation point and the icon position on the straight line is $d_i = x_i - x_t$, where $x_i$ represents the projection coordinates of the $i^{th}$ navigation point on the straight line, $x_t$ represents the projection coordinates of the icon position on the straight line, and $1 \leq i \leq n$.

Figure 2G:
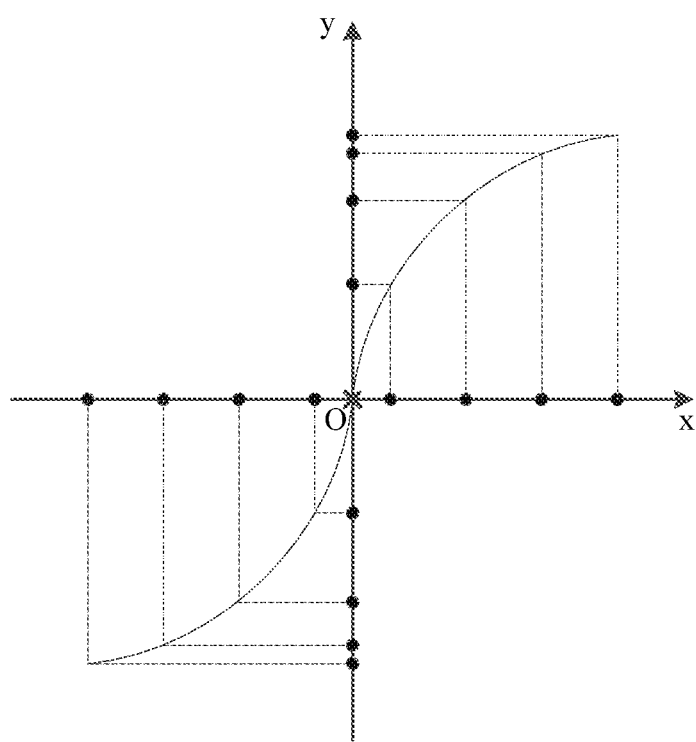
FIG. 2G is a schematic diagram involved in updating coordinates of each navigation point by using an algorithm based on a parabolic function according to an embodiment of the present disclosure.

As shown in FIG. 2G, FIG. 2G shows a schematic diagram involved in updating coordinates of each navigation point by using an algorithm based on a parabolic function. In a two-dimensional rectangular coordinate system, an x axis and a y axis are perpendicular and intersect at a center point O. Before the coordinates of each navigation point are updated, it is assumed that the n navigation points are arranged along the x axis at equal intervals and the distance between two neighboring navigation points is λ×a. In addition, it is assumed that the icon position is shown as "x" in FIG. 2G. After the coordinates of each navigation point are updated according to a feature of the parabolic function, the foregoing n navigation points may be displayed in a y-axis sequential arranging effect, where the display effect is the fisheye effect.

2. Calculate a first percentage value corresponding to the navigation point.

The first percentage value corresponding to the navigation point is calculated by using the parabolic function. A first percentage value corresponding to the $i^{th}$ navigation point is $P_i = d_i \hat{\ } c$, where c is a preset constant, and $0 < 1 < c$. The first percentage value Pi corresponding to the $i^{th}$ navigation point is used to represent a percentage of a distance between the $i^{th}$ navigation point and the icon position in a length of an entire navigation bar in the fisheye effect, where the length of the navigation bar is equal to a distance between the first navigation point and the $n^{th}$ navigation point.

3. Update projection coordinates of the navigation point on the straight line according to the first percentage value.

Updated projection coordinates of the $i^{th}$ navigation point on the straight line are $$X_i = x_t + \frac{L}{|P_1| + |P_n|} \times P_i,$$

where L is a preset constant and L>0, $|P_i|+|P_n|$ refers to a sum of a percentage of the distance between the first navigation point and the icon position to the length of the entire navigation bar and a percentage of a distance between the $n^{th}$ navigation point and the icon position to the length of the entire navigation bar in the fisheye effect, and L refers to the length of the entire navigation bar in the fisheye effect. Therefore, $$\left| \frac{L}{|P_1| + |P_n|} \times P_i \right|$$

refers to the distance between the $i^{th}$ navigation point and the icon position in the fisheye effect, and the updated projection coordinates of the $i^{th}$ navigation point on the straight line $$X_i = x_t + \frac{L}{|P_1| + |P_n|} \times P_i$$

may be obtained by calculation according to the distance between the $i^{th}$ navigation point and the icon position and the projection coordinates of the icon position on the straight line.

In a normal case, a value of L is a value of a distance between the first navigation point and the last navigation point when the distance between two neighboring navigation points among the n navigation points is displayed after being scaled up.

In addition, to prevent the icon from blocking a navigation point, it needs to be ensured that the distance between the two neighboring navigation points that are closest to the icon position is greater than the width of the icon after the coordinates of each navigation point are updated. Optionally, a predetermined ratio value is preset, and a ratio of the distance between the two neighboring navigation points that are closest to the icon position to the width of the icon needs to be greater than the predetermined ratio value. After projection coordinates of each navigation point are determined by using the foregoing algorithm, whether the ratio of the distance between the two neighboring navigation points that are closest to the icon position to the width of the icon is greater than the predetermined ratio value is detected. If the ratio is smaller than the predetermined ratio value, the width of the icon and/or the distance between the two neighboring navigation points that are closest to the icon position are/is scaled, so as to avoid bringing visual disturbance to the user because the icon blocks a navigation point.

Coordinates of each navigation point in the fisheye effect are calculated by using the algorithm based on a parabolic function, so that a distance between neighboring navigation points can vary smoothly and coherently when a user drags and moves an icon among all the navigation points, and visual disturbance such as shifting or flickering does not occur.

When the predetermined algorithm is the algorithm based on a geometric function, this step may include 1. When the n navigation points are arranged along a straight line, for each navigation point, calculate a second percentage value corresponding to the navigation point.

Figure 2H:
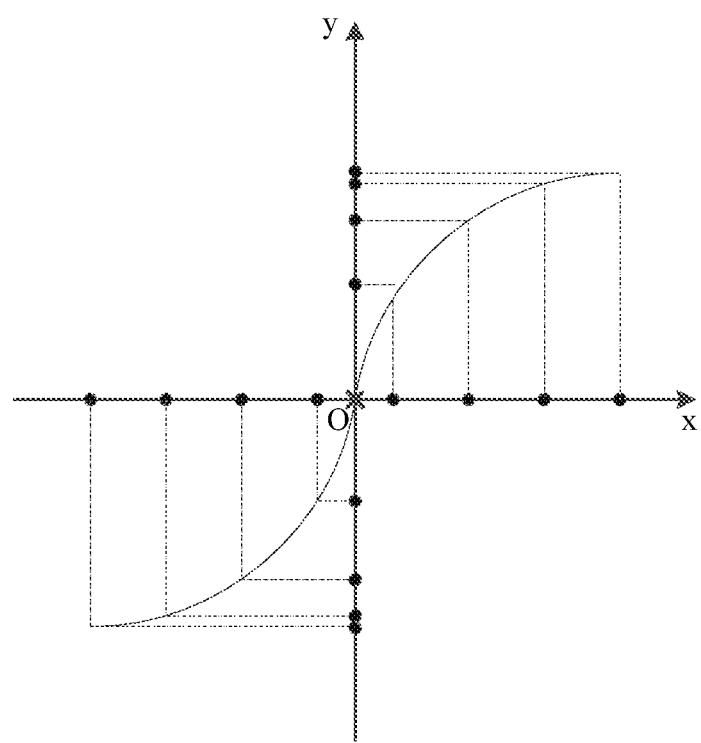
FIG. 2H is a schematic diagram involved in updating coordinates of each navigation point by using an algorithm based on a geometric progression according to an embodiment of the present disclosure.

Based on a principle that the closer two neighboring navigation points are to the icon position, the greater the distance between the two neighboring navigation points is, and the farther two neighboring navigation points are away from the icon position, the smaller the distance between the two neighboring navigation points is, the coordinates of each navigation point in the fisheye effect may further be calculated by using the algorithm based on a geometric function. As shown in FIG. 2H, FIG. 2H shows a schematic diagram involved in updating coordinates of each navigation point by using the algorithm based on a geometric progression. In a two-dimensional rectangular coordinate system, an x axis and a y axis are perpendicular and intersect at a center point O. Before the coordinates of each navigation point are updated, it is assumed that the n navigation points are arranged along the x axis at equal intervals and the distance between two neighboring navigation points is $\lambda \times a$. In addition, it is assumed that the icon position is shown as "x" in FIG. 2H. After the coordinates of each navigation point are updated according to a feature of the geometric progression, the foregoing n navigation points may be displayed in a y-axis sequential arranging effect, where the display effect is the fisheye effect. A distance between two neighboring navigation points on two sides of the icon is largest, and it is assumed that the distance is $l_{max}$; and distances between two neighboring navigation points that are sequentially arranged from the icon position to an edge of the touchscreen are sequentially $l_{max} \times q$, $l_{max} \times q^2$, $l_{max} \times q^3$ ..., $0 < q < 1$.

The second percentage value corresponding to the navigation point is calculated by using the geometric progression. A second percentage value corresponding to the $i^{th}$ navigation point is $f(i)=f(t) \times q^{|i-t|}$, where the $t^{th}$ navigation point refers to either of the two navigation points closest to the icon position and the either one is closest to the first navigation point, $1 \leq i \leq n$, $1 \leq t \leq n-1$, and q is a preset constant and $0 < q < 1$. The second percentage value f(i) corresponding to the $i^{th}$ navigation point is used to represent a percentage of a distance between the $i^{th}$ navigation point and the $(i+1)^{th}$ navigation point in a length of an entire navigation bar in the fisheye effect, where the length of the navigation bar is equal to a distance between the first navigation point and the $n^{th}$ navigation point.

2. Update projection coordinates of the navigation point on the straight line according to the second percentage value.

Updated projection coordinates of the $i^{th}$ navigation point on the straight line are $$X_i = x_0 + \sum_{i=1}^{i-1} f(i) \times \frac{L}{\sum_{i=1}^{n-1} f(i)},$$

where L is a preset constant and L>0, $x_0$ is a preset constant and $x_0 \geq 0$, $$\sum_{i=1}^{n-1} f(i)$$

refers to a percentage of the distance between the first navigation point and the $n^{th}$ navigation point in the length of the entire navigation bar in the fisheye effect, and L refers to the length of the entire navigation bar in the fisheye effect. Therefore, $$\sum_{i=1}^{i-1} f(i) \times \frac{L}{\sum_{i=1}^{n-1} f(i)}$$

refers to a distance between the first navigation point and the $i^{th}$ navigation point in the fisheye effect, the updated projection coordinates of the $i^{th}$ navigation point on the straight line $$X_i = x_0 + \sum_{i=1}^{i-1} f(i) \times \frac{L}{\sum_{i=1}^{n-1} f(i)}$$

may be obtained by calculation according to the distance between the first navigation point and the $i^{th}$ navigation point and a distance $x_0$ between the first navigation point and a screen edge.

In a normal case, a value of L is a value of a distance between the first navigation point and the last navigation point when the distance between two neighboring navigation points among the n navigation points is displayed after being scaled up. A value of $x_0$ is the distance between the first navigation point and the screen edge when the distance between two neighboring navigation points among the n navigation points is displayed after being scaled up.

Similar to the algorithm based on a parabolic function, after projection coordinates of each navigation point are determined by using the foregoing algorithm, the width of the icon and/or the distance between two navigation points closest to the icon position may be scaled according to a predetermined ratio value, so as to avoid bringing visual disturbance to a user because the icon blocks a navigation point.

When the predetermined algorithm is the algorithm based on an arithmetic function, this step may include 1. When the n navigation points are arranged along a straight line, scale a distance b between two navigation points closest to the icon position to w according to a width k of the icon, where w>k, and b>0.

By scaling the distance b between the two navigation points closest to the icon position to w according to the width k of the icon, it can be ensured that the icon does not block a navigation point in the fisheye effect.

In addition, it is assumed that the two navigation points closest to the icon position are the $t^{th}$ navigation point and the $(t+1)^{th}$ navigation point, and $1 \le t \le n-1$.

Figure 2I:
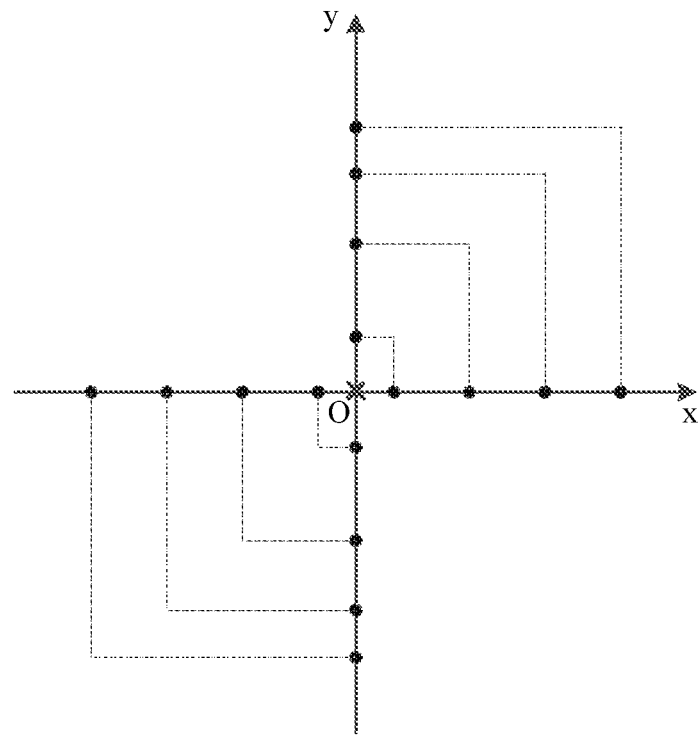
FIG. 2I is a schematic diagram involved in updating coordinates of each navigation point by using an algorithm based on an arithmetic progression according to an embodiment of the present disclosure.

2. For the $i^{th}$ navigation point, a distance between the $i^{th}$ navigation point and the $(i+1)^{th}$ navigation point $D(i)=w+d \times |i-t|$ is calculated. Based on a principle that the closer two neighboring navigation points are to the icon position, the greater the distance between the two neighboring navigation points is, and the farther two neighboring navigation points are away from the icon position, the smaller the distance between the two neighboring navigation points is, the coordinates of each navigation point in the fisheye effect may further be calculated by using the algorithm based on an arithmetic function. As shown in FIG. 2I, FIG. 2I shows a schematic diagram involved in updating coordinates of each navigation point by using an algorithm based on an arithmetic progression. In a two-dimensional rectangular coordinate system, an x axis and a y axis are perpendicular and intersect at a center point O. Before the coordinates of each navigation point are updated, it is assumed that the n navigation points are arranged along the x axis at equal intervals and the distance between two neighboring navigation points is $\lambda \times a$. In addition, it is assumed that the icon position is shown as "x" in FIG. 2I. After the coordinates of each navigation point are updated according to a feature of the arithmetic progression, the foregoing n navigation points may be displayed in a y-axis sequential arranging effect, where the display effect is the fisheye effect. A distance between two neighboring navigation points on two sides of the icon is largest, and it is assumed that the distance is $l_{max}$; and distances between two neighboring navigation points that are sequentially arranged from the icon position to an edge of the touchscreen are sequentially $l_{max}+d$, $l_{max}+2d$, $l_{max}+3d \ldots$, $d<0$.

The distance between the $i^{th}$ navigation point and the $(i+1)^{th}$ navigation point $D(i)=w+d \times |i-t|$ is calculated by using the arithmetic progression, where $$\sum_{i=1}^{n-1} D(i) = L,$$

L is a preset constant and L>0, $1 \le i \le n-1$, and d is a preset constant and d<0.

In a normal case, a value of L is a value of a distance between the first navigation point and the last navigation point when the distance between two neighboring navigation points among the n navigation points is displayed after being scaled up.

3. Update projection coordinates of each navigation point on the straight line according to the distance that is between the $i^{th}$ navigation point and the $(i+1)^{th}$ navigation point and obtained by calculation.

After the distance between any two neighboring navigation points is determined, the projection coordinates of each navigation point on the straight line may be obtained by calculation.

It should be noted that, a process of calculating the coordinates of each navigation point in the fisheye effect by using only the foregoing three different algorithms is used as an example for description in this embodiment. In another possible embodiment, the coordinates of each navigation point in the fisheye effect may further be calculated by using another algorithm, which is not limited in this embodiment.

Secondly, display the n navigation points in the fisheye effect according to updated coordinates of each navigation point.

After the coordinates of each navigation point in the fisheye effect are obtained by calculation, the electric device displays the n navigation points in the fisheye effect on the screen. As the user moves the icon in the predetermined area, a position of each navigation point also changes accordingly.

In conclusion, according to the method for moving an icon provided in this embodiment of the present disclosure, an icon position of a selected icon on a display interface is acquired; when the icon position is in a predetermined area, a navigation point matching the icon position is determined according to the icon position; and then the icon is moved to a page that is corresponding to the navigation point matching the icon position, thereby solving a problem, in the method for moving an icon involved in the Background, that an operation is relatively complex and operating efficiency is relatively low when cross-page moving is performed on an icon, simplifying an operation that is required when cross-page moving is performed on an icon; and fully enhancing the operating efficiency.

In addition, displaying navigation points in a fisheye effect may make it convenient for a user to drag an icon among the navigation points so as to trigger page switching; prevent instantaneous switching of multiple pages due to an excessively small distance between neighboring navigation points; facilitate more convenient and accurate switching, by the user, to a target page; and enhance perceptibility and usability of a function.

In a specific example, an electronic device receives a touch event of a user by using a touchscreen, where the touch event includes a Down event of touching and holding a selected icon by the user, a Move event of dragging the icon, and an Up event of finger releasing. After the touchscreen receives the touch event of the user, the touch event is reported to an upper-layer application by using a bottom-layer driver. After an upper-layer desktop application program Launcher receives the touch event, an onDragOver function under a QuickNavigationView class is invoked according to different types of touch events by using an event processing function onTouchEvent to calculate coordinates of navigation points, where the coordinates include coordinates that are scaled up and displayed at equal intervals or coordinates in a fisheye effect. Then, an onDraw function is invoked to draw the navigation points according to the coordinates that are obtained by calculation and display the navigation points on the screen.

The following is an apparatus embodiment of the present disclosure, and the apparatus may be used to execute the method embodiment of the present disclosure. For details not disclosed in the apparatus embodiment of the present disclosure, reference may be made to the method embodiment of the present disclosure.

Figure 3:
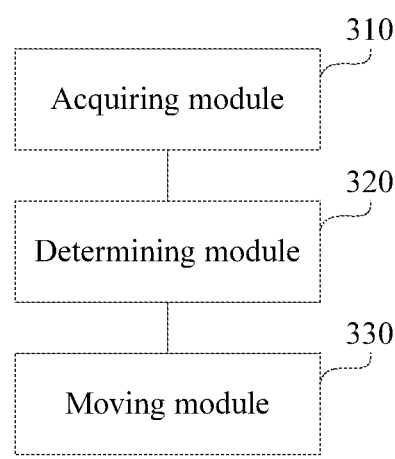
FIG. 3 is a structural block diagram of an apparatus for moving an icon according to an embodiment of the present disclosure.

Referring to FIG. 3, FIG. 3 shows a structural block diagram of an apparatus for moving an icon according to an embodiment of the present disclosure, and the apparatus for moving an icon may be implemented as a part or all of an electronic device by using software, hardware, or a combination of the software and the hardware. The apparatus for moving an icon may include an acquiring module 310, a determining module 320, and a moving module 330.

The acquiring module 310 is configured to acquire an icon position of a selected icon on a display interface.

The determining module 320 is configured to, when the icon position acquired by the acquiring module 310 is in a predetermined area, determine, according to the icon position, a navigation point matching the icon position, where the predetermined area includes n navigation points, each navigation point is corresponding to one page, and n≥2.

The moving module 330 is configured to, after the determining module 320 determines the navigation point matching the icon position, move the icon to a page that is corresponding to the navigation point matching the icon position.

In conclusion, according to the apparatus for moving an icon provided in this embodiment of the present disclosure, an icon position of a selected icon on a display interface is acquired; when the icon position is in a predetermined area, a navigation point matching the icon position is determined according to the icon position; and then the icon is moved to a page that is corresponding to the navigation point matching the icon position, thereby solving a problem, in the method for moving an icon involved in the Background, that an operation is relatively complex and operating efficiency is relatively low when cross-page moving is performed on an icon, simplifying an operation that is required when cross-page moving is performed on an icon; and fully enhancing the operating efficiency.

Figure 4:
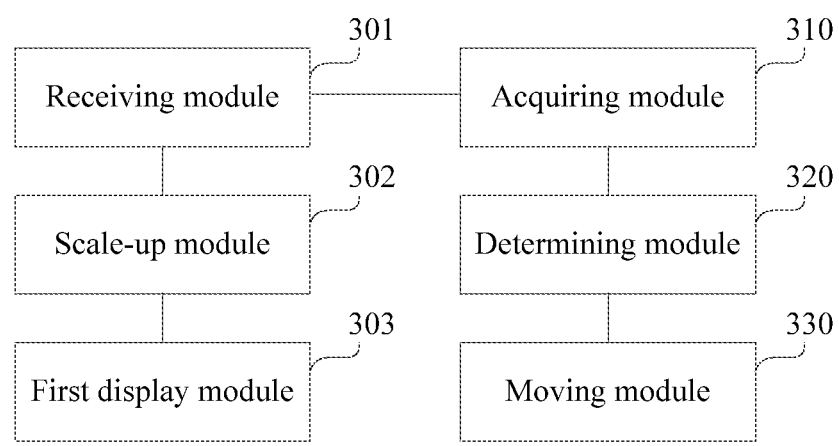
FIG. 4 is a structural block diagram of an apparatus for moving an icon according to another embodiment of the present disclosure.

Referring to FIG. 4, FIG. 4 shows a structural block diagram of an apparatus for moving an icon according to another embodiment of the present disclosure, and the apparatus for moving an icon may be implemented as a part or all of an electronic device by using software, hardware, or a combination of the software and the hardware. The apparatus for moving an icon may include an acquiring module 310, a determining module 320, and a moving module 330.

The acquiring module 310 is configured to acquire an icon position of a selected icon on a display interface.

The determining module 320 is configured to, when the icon position acquired by the acquiring module 310 is in a predetermined area, determine, according to the icon position, a navigation point matching the icon position, where the predetermined area includes n navigation points, each navigation point is corresponding to one page, and n≥2.

The moving module 330 is configured to, after the determining module 320 determines the navigation point matching the icon position, move the icon to a page that is corresponding to the navigation point matching the icon position.

Optionally, the apparatus further includes a receiving module 301, a scale-up module 302, and a first display module 303.

The receiving module 301 is configured to receive a selection signal corresponding to the icon.

The scale-up module 302 is configured to scale up a distance between two neighboring navigation points among the n navigation points after the receiving module 301 receives the selection signal.

The first display module 303 is configured to display the n navigation points after the distance is scaled up by the scale-up module 302.

Compared with the embodiment shown in FIG. 3, a prompt may be sent out to a user by using a change of a distance between navigation points, to prompt the user to drag a selected icon near the navigation points.

Figure 5:
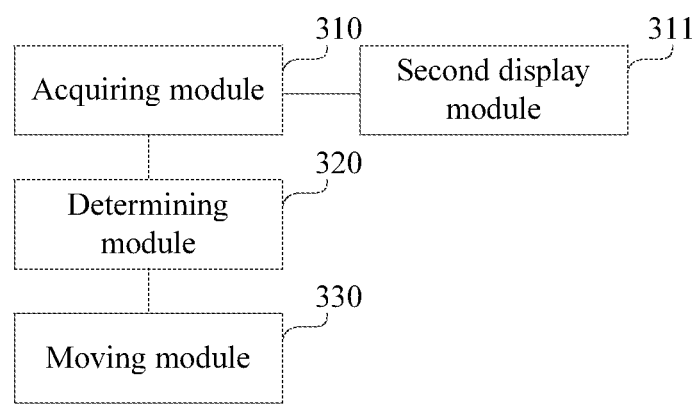
FIG. 5 is a structural block diagram of an apparatus for moving an icon according to another embodiment of the present disclosure.

Referring to FIG. 5, FIG. 5 shows a structural block diagram of an apparatus for moving an icon according to another embodiment of the present disclosure, and the apparatus for moving an icon may be implemented as a part or all of an electronic device by using software, hardware, or a combination of the software and the hardware. The apparatus for moving an icon may include an acquiring module 310, a determining module 320, and a moving module 330.

The acquiring module 310 is configured to acquire an icon position of a selected icon on a display interface.

The determining module 320 is configured to, when the icon position acquired by the acquiring module 310 is in a predetermined area, determine, according to the icon position, a navigation point matching the icon position, where the predetermined area includes n navigation points, each navigation point is corresponding to one page, and n≥2.

The moving module 330 is configured to, after the determining module 320 determines the navigation point matching the icon position, move the icon to a page that is corresponding to the navigation point matching the icon position.

Optionally, the apparatus further includes a second display module 311.

The second display module 311 is configured to, when the icon position is in the predetermined area, display the icon and the n navigation points in a predetermined effect, where the predetermined effect refers to that a distance between two navigation points closest to the icon position is greater than a width of the icon.

Compared with the embodiment shown in FIG. 3, when an icon position is in a predetermined area, the icon position and n navigation points are displayed in a predetermined effect, so as to ensure that an icon does not block a navigation point, and avoid affecting a user operation or bringing visual disturbance to a user because an icon blocks a navigation point.

Figure 6:
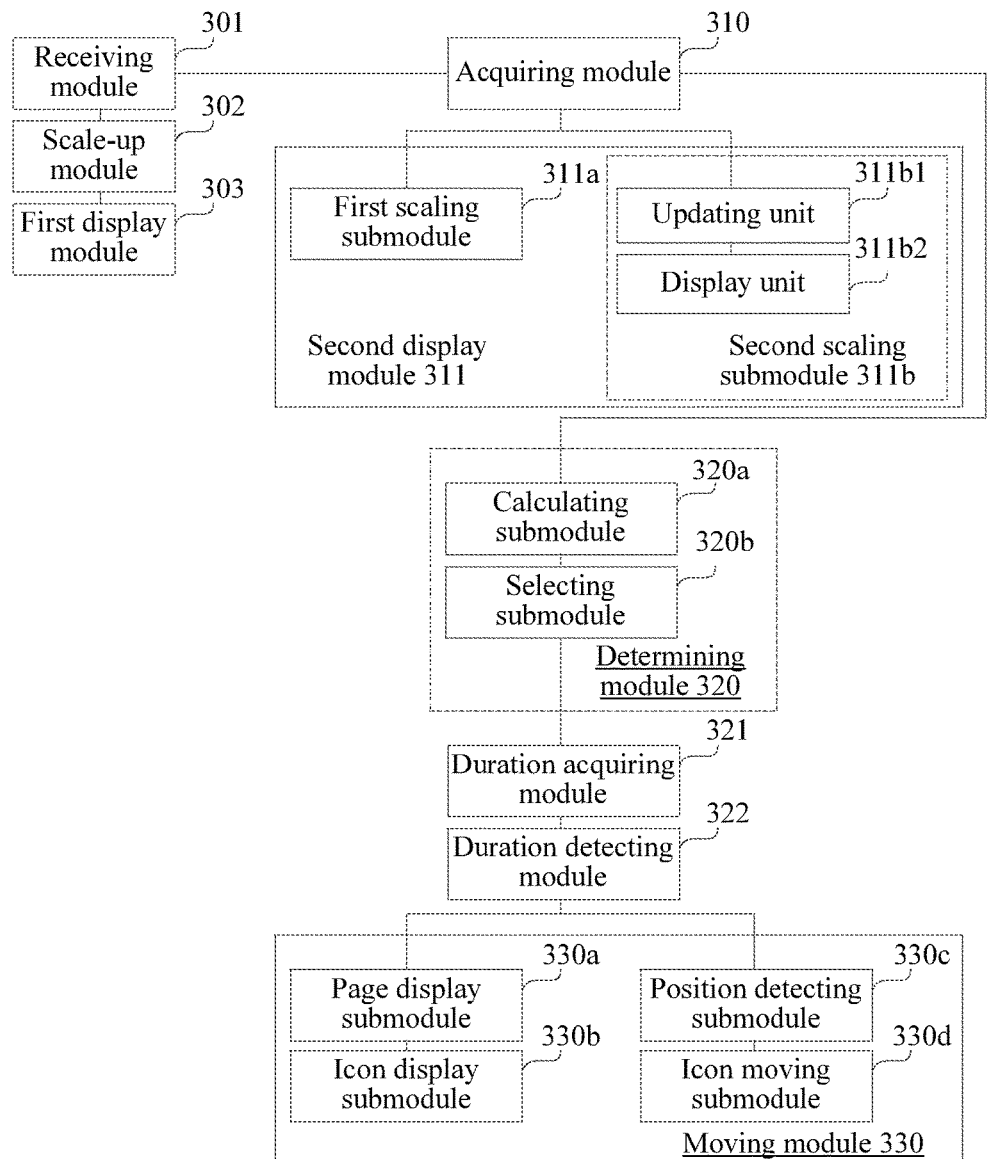
FIG. 6 is a structural block diagram of an apparatus for moving an icon according to another embodiment of the present disclosure.

Referring to FIG. 6, FIG. 6 shows a structural block diagram of an apparatus for moving an icon according to another embodiment of the present disclosure. The apparatus for moving an icon may be implemented as a part or all of an electronic device by using software, hardware, or a combination of the software and the hardware. The apparatus for moving an icon may include an acquiring module 310, a determining module 320, and a moving module 330.

The acquiring module 310 is configured to acquire an icon position of a selected icon on a display interface.

The determining module 320 is configured to, when the icon position acquired by the acquiring module 320 is in a predetermined area, determine, according to the icon position, a navigation point matching the icon position, where the predetermined area includes n navigation points, each navigation point is corresponding to one page and n≥2.

The determining module 320 includes a calculating submodule 320a and a selecting submodule 320b.

The calculating submodule 320a is configured to, when the n navigation points are arranged along a straight line, calculate projection distances between the navigation points and the icon position on the straight line, where a projection distance between the $i^{th}$ navigation point and the icon position on the straight line is $l_i=|x_i-x_t|$, where $x_i$ represents projection coordinates of the $i^{th}$ navigation point on the straight line, $x_t$ represents projection coordinates of the icon position on the straight line, and $1 \leq i \leq n$.

The selecting submodule 320b is configured to, after the calculating submodule 320a obtains the projection distances between the navigation points and the icon position on the straight line by calculation, select a navigation point with a smallest projection distance from the icon position on the straight line as the navigation point matching the icon position.

The moving module 330 is configured to, after the determining module 320 determines the navigation point matching the icon position, move the icon to a page that is corresponding to the navigation point matching the icon position.

In a first possible implementation manner, the moving module 330 includes a page display submodule 330a and an icon display submodule 330b.

The page display submodule 330a is configured to display the page that is corresponding to the navigation point matching the icon position.

The icon display submodule 330b is configured to, when the icon is dragged to a target position of the page displayed by the page display submodule 330a and is released, display the icon at the target position of the page.

In a second possible implementation manner, the moving module 330 includes a position detecting submodule 330c and an icon moving submodule 330d.

The position detecting submodule 330c is configured to detect whether a vacant position that is used to display the icon exists on the page that is corresponding to the navigation point matching the icon position.

The icon moving submodule 330d is configured to, when the position detecting submodule 330c detects that the vacant position exists, move and display the icon at the vacant position.

Optionally, the apparatus further includes a receiving module 301, a scale-up module 302, and a first display module 303.

The receiving module 301 is configured to receive a selection signal corresponding to the icon.

The scale-up module 302 is configured to scale up a distance between two neighboring navigation points among the n navigation points after the receiving module 301 receives the selection signal.

The first display module 303 is configured to display the n navigation points after the distance is scaled up by the scale-up module 302.

Optionally, the apparatus further includes a second display module 311.

The second display module 311 is configured to, when the icon position is in the predetermined area, display the icon and the n navigation points in a predetermined effect, where the predetermined effect refers to that a distance between two navigation points closest to the icon position is greater than a width of the icon.

The second display module 311 includes a first scaling submodule 311a and/or a second scaling submodule 311b.

The first scaling submodule 311a is configured to perform scaling, for display, on the width of the icon according to the distance between the two navigation points closest to the icon position.

The second scaling submodule 311b is configured to perform scaling, for display, on the distance between the two navigation points closest to the icon position according to the width of the icon.

The second scaling submodule 311b includes an updating unit 311b1 and a display unit 311b2.

The updating unit 311b1 is configured to update coordinates of each navigation point by using a predetermined algorithm.

The display unit 311b2 is configured to, after the updating unit 311b1 updates the coordinates of each navigation point, display the n navigation points in a fisheye effect according to updated coordinates of each navigation point, where the fisheye effect refers to that the distance between two neighboring navigation points is in a negative correlation to proximity between the two neighboring navigation points and the icon position.

Optionally, the apparatus further includes a duration acquiring module 321 and a duration detecting module 322.

The duration acquiring module 321 is configured to acquire stay duration for which the icon position has been in the predetermined area.

The duration detecting module 322 is configured to detect whether the stay duration acquired by the duration acquiring module 321 is greater than a predetermined threshold.

The moving module 330 is further configured to, when the duration detecting module 322 detects that the stay duration is greater than the predetermined threshold, move the icon to the page that is corresponding to the navigation point matching the icon position.

Optionally, the updating unit 311b1 includes a difference acquiring subunit, a first calculating subunit, and a first updating subunit.

The difference acquiring subunit is configured to, when the n navigation points are arranged along a straight line, for each navigation point, acquire a difference between projection coordinates of the navigation point and the icon position on the straight line, where a difference between projection coordinates of the $i^{th}$ navigation point and the icon position on the straight line is $d_i = x_i - x_t$, where $x_i$ represents the projection coordinates of the $i^{th}$ navigation point on the straight line, $x_t$ represents the projection coordinates of the icon position on the straight line, and $1 \leq i \leq n$.

The first calculating subunit is configured to calculate a first percentage value corresponding to the navigation point, where a first percentage value corresponding to the $i^{th}$ navigation point is $P_i = d_i\hat{\ }c$, where c is a preset constant, and $0 < 1 < c$.

The first updating subunit is configured to update the projection coordinates of the navigation point on the straight line according to the first percentage value, where updated projection coordinates of the $i^{th}$ navigation point on the straight line are $$X_i = x_t + \frac{L}{|P_1| + |P_n|} \times P_i,$$

where L is a preset constant, and L>0.

Optionally, the updating unit 311b1 includes a second calculating subunit and a second updating subunit.

The second calculating subunit is configured to, when the n navigation points are arranged along a straight line, for each navigation point, calculate a second percentage value corresponding to the navigation point, where a second percentage value corresponding to the $i^{th}$ navigation point is $f(i) = f(t) \times q^{|i-t|}$, where the $t^{th}$ navigation point refers to either of the two navigation points closest to the icon position and the either one is closest to the first navigation point, $1 \leq i \leq n$, $1 \leq t \leq n-1$, and q is a preset constant and $0 < q < 1$.

The second updating subunit is configured to update projection coordinates of the navigation point on the straight line according to the second percentage value, where updated projection coordinates of the $i^{th}$ navigation point on the straight line are $$X_i = x_0 + \sum_{i=1}^{i-1} f(i) \times \frac{L}{\sum_{i=1}^{n-1} f(i)},$$

where L is a preset constant and L>0, and $x_0$ is a preset constant and $x_0 \geq 0$.

Optionally, the updating unit 311b1 includes a distance scaling subunit, a third calculating subunit, and a third updating subunit.

The distance scaling subunit is configured to, when the n navigation points are arranged along a straight line, scale a distance b between two navigation points closest to the icon position to w according to a width k of the icon, where w>k, b>0, the two navigation points closest to the icon position are the $t^{th}$ navigation point and the $(t+1)^{th}$ navigation point, and $1 \leq t \leq n-1$.

The third calculating subunit is configured to, for the $i^{th}$ navigation point, calculate a distance between the $i^{th}$ navigation point and the $(i+1)^{th}$ navigation point, that is, $D(i)=w+d \times |i-t|$, where $$\sum_{i=1}^{n-1} D(i) = L,$$

L is a preset constant and L>0, $1 \leq i \leq n-1$, and d is a preset constant and d<0.

The third updating subunit is configured to update projection coordinates of each navigation point on the straight line according to the distance that is between the $i^{th}$ navigation point and the $(i+1)^{th}$ navigation point and obtained by calculation.

In conclusion, according to the apparatus for moving an icon provided in this embodiment of the present disclosure, an icon position of a selected icon on a display interface is acquired; when the icon position is in a predetermined area, a navigation point matching the icon position is determined according to the icon position; and then the icon is moved to a page that is corresponding to the navigation point matching the icon position, thereby solving a problem, in the method for moving an icon involved in the Background, that an operation is relatively complex and operating efficiency is relatively low when cross-page moving is performed on an icon, simplifying an operation that is required when cross-page moving is performed on an icon; and fully enhancing the operating efficiency.

In addition, displaying navigation points in a fisheye effect may make it convenient for a user to drag an icon among the navigation points so as to trigger page switching; prevent instantaneous switching of multiple pages due to an excessively small distance between neighboring navigation points; facilitate more convenient and accurate switching, by the user, to a target page; and enhance perceptibility and usability of a function.

It should be noted that, the division of the foregoing functional modules is merely used as an example for description when the apparatus for moving an icon and the electronic device provided in the foregoing embodiment moves an icon. In an actual application, the functions may be allocated to different function modules to complete according to requirements, that is, an internal structure of the device is divided into different function modules for completing all or a part of functions described above. In addition, the apparatus for moving an icon, the electronic device, and the method for moving an icon provided in the foregoing embodiments pertain to a same concept as the embodiments of the method for moving an icon. For a specific process implemented by the apparatus for moving an icon and the electronic device, reference may be made to the method embodiments, which are not described herein again.

Figure 7:
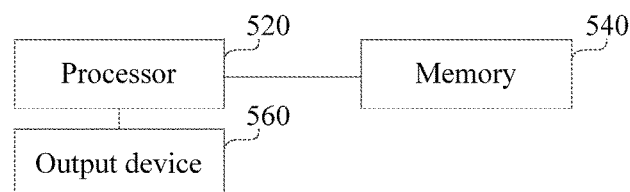
FIG. 7 is a schematic structural diagram of an electronic device according to an embodiment of the present disclosure.

Referring to FIG. 7, FIG. 7 shows a schematic structural diagram of an electronic device according to an embodiment of the present disclosure. The electronic device includes a processor 520, a memory 540 and an output device 560 that are connected to the processor 520. The memory 540 stores one or more programs, and the processor 520 may implement a corresponding operation according to the one or more programs that are stored in the memory 540. The processor 520 is configured to acquire an icon position of a selected icon on a display interface that is output by the output device 560. Optionally, in an implementation manner of this embodiment of the present disclosure, the output device 560 may be a touchscreen; that is, the processor 520 may acquire the icon position of the selected icon on the display interface that is presented by the touchscreen.

The processor 520 is further configured to, when the icon position is in a predetermined area, determine, according to the icon position, a navigation point matching the icon position, where the predetermined area includes n navigation points, each navigation point is corresponding to one page, and $n \geq 2$.

The processor 520 is further configured to move the icon to a page that is corresponding to the navigation point matching the icon position.

In conclusion, according to the electronic device provided in this embodiment of the present disclosure, an icon position of a selected icon on a display interface is acquired; when the icon position is in a predetermined area, a navigation point matching the icon position is determined according to the icon position; and then the icon is moved to a page that is corresponding to the navigation point matching the icon position, thereby solving a problem, in the method for moving an icon involved in the Background, that an operation is relatively complex and operating efficiency is relatively low when cross-page moving is performed on an icon, simplifying an operation that is required when cross-page moving is performed on an icon; and fully enhancing the operating efficiency.

In a first possible implementation manner of the embodiment shown in FIG. 7, the processor 520 is further configured to, when the n navigation points are arranged along a straight line, calculate projection distances between the navigation points and the icon position on the straight line, where a projection distance between the $i^{th}$ navigation point and the icon position on the straight line is $l_i=|x_i-x_t|$, where $x_i$ represents projection coordinates of the $i^{th}$ navigation point on the straight line, $x_t$ represents projection coordinates of the icon position on the straight line, and $1 \leq i \leq n$.

The processor 520 is further configured to select a navigation point with a smallest projection distance from the icon position on the straight line as the navigation point matching the icon position.

In a second possible implementation manner of the embodiment shown in FIG. 7, the processor 520 is further configured to receive a selection signal corresponding to the icon.

The processor 520 is further configured to scale up a distance between two neighboring navigation points among the n navigation points after the selection signal is received.

The processor 520 is further configured to control the output device 560 to display the n navigation points after the distance is scaled up.

In a third possible implementation manner of the embodiment shown in FIG. 7, the processor 520 is further configured to, when the icon position is in the predetermined area, control the output device 560 to display the icon and the n navigation points in a predetermined effect, where the predetermined effect refers to that a distance between two navigation points closest to the icon position is greater than a width of the icon.

In a fourth possible implementation manner of the embodiment shown in FIG. 7, the processor 520 is further configured to, after scaling is performed on the width of the icon according to the distance between the two navigation points closest to the icon position, control the output device 560 to perform display, and/or, the processor 520 is further configured to, after scaling is performed on the distance between the two navigation points closest to the icon position according to the width of the icon, control the output device 560 to perform display.

In a fifth possible implementation manner of the embodiment shown in FIG. 7, the processor 520 is further configured to update coordinates of each navigation point by using a predetermined algorithm.

The processor 520 is further configured to control the output device 560 to display the n navigation points in a fisheye effect according to updated coordinates of each navigation point, where the fisheye effect refers to that the distance between two neighboring navigation points is in a negative correlation to proximity between the two neighboring navigation points and the icon position.

In a sixth possible implementation manner of the embodiment shown in FIG. 7, the processor 520 is further configured to, when the n navigation points are arranged along a straight line, for each navigation point, acquire a difference between projection coordinates of the navigation point and the icon position on the straight line, where a difference between projection coordinates of the $i^{th}$ navigation point and the icon position on the straight line is $d_i=x_i-x_t$, where $x_i$ represents the projection coordinates of the $i^{th}$ navigation point on the straight line, $x_t$ represents the projection coordinates of the icon position on the straight line, and $1 \le i \le n$.

The processor 520 is further configured to calculate a first percentage value corresponding to the navigation point, where a first percentage value corresponding to the $i^{th}$ navigation point is $P_i=d_i{}^c$, where c is a preset constant, and $0<1<c$.

The processor 520 is further configured to update the projection coordinates of the navigation point on the straight line according to the first percentage value, where updated projection coordinates of the $i^{th}$ navigation point on the straight line are $$X_i = x_t + \frac{L}{|P_1|+|P_n|} \times P_i,$$

where L is a preset constant, and L>0.

In a seventh possible implementation manner of the embodiment shown in FIG. 7, the processor 520 is further configured to, when the n navigation points are arranged along a straight line, for each navigation point, calculate a second percentage value corresponding to the navigation point, where a second percentage value corresponding to the $i^{th}$ navigation point is $f(i)=f(t) \times q^{|i-t|}$, where the tth navigation point refers to either of the two navigation points closest to the icon position and the either one is closest to the first navigation point, $1 \le i \le n$, $1 \le t \le n-1$, and q is a preset constant and $0<q<1$.

The processor 520 is further configured to update projection coordinates of the navigation point on the straight line according to the second percentage value, where updated projection coordinates of the $i^{th}$ navigation point on the straight line are $$X_i = x_0 + \sum_{i=1}^{i-1} f(i) \times \frac{L}{\sum_{i=1}^{n-1} f(i)},$$

where L is a preset constant and L>0, and $x_0$ is a preset constant and $x_0 \ge 0$.

In an eighth possible implementation manner of the embodiment shown in FIG. 7, the processor 520 is further configured to, when the n navigation points are arranged along a straight line, scale a distance b between two navigation points closest to the icon position to w according to a width k of the icon, where w>k, b>0, the two navigation points closest to the icon position are the $t^{th}$ navigation point and the $(t+1)^{th}$ navigation point, and $1 \le t \le n-1$.

The processor 520 is further configured to, for the $i^{th}$ navigation point, calculate a distance between the $i^{th}$ navigation point and the $(i+1)^{th}$ navigation point, that is, $D(i)=w+d \times |i-t|$, where $$\sum_{i=1}^{n-1} D(i) = L,$$

L is a preset constant and L>0, $1 \le i \le n-1$, and d is a preset constant and d<0.

The processor 520 is further configured to update projection coordinates of each navigation point on the straight line according to the distance that is between the $i^{th}$ navigation point and the $(i+1)^{th}$ navigation point and obtained by calculation.

In a ninth possible implementation manner of the embodiment shown in FIG. 7, the processor 520 is further configured to control the output device 560 to display the page that is corresponding to the navigation point matching the icon position.

The processor 520 is further configured to, when the icon is dragged to a target position of the page and is released, control the output device 560 to display the icon at the target position of the page.

In a tenth possible implementation manner of the embodiment shown in FIG. 7, the processor 520 is further configured to detect whether a vacant position that is used to display the icon exists on the page that is corresponding to the navigation point matching the icon position.

The processor 520 is further configured to, if the vacant position exists, move the icon and control the output device 560 to display the icon at the vacant position.

In an eleventh possible implementation manner of the embodiment shown in FIG. 7, the processor 520 is further configured to acquire stay duration for which the icon position has been in the predetermined area.

The processor 520 is further configured to detect whether the stay duration is greater than a predetermined threshold.

The processor 520 is further configured to, if the stay duration is greater than the predetermined threshold, move the icon to the page that is corresponding to the navigation point matching the icon position.

By displaying navigation points in a fisheye effect, the electronic device provided in this embodiment may further make it convenient for a user to drag an icon among the navigation points so as to trigger page switching; prevent instantaneous switching of multiple pages due to an excessively small distance between neighboring navigation points; facilitate more convenient and accurate switching, by the user, to a target page; and enhance perceptibility and usability of a function. According to another aspect, another embodiment of the present disclosure further provides a graphical user interface, where the graphical user interface is disposed on an electronic device; the electronic device includes a display, a touch-sensitive surface, a memory, and one or more processors that are configured to execute one or more programs stored in the memory; and the graphical user interface includes a selected icon and n navigation points, Where An icon position of the selected icon on a display interface is acquired.

When the icon position is in a predetermined area, a navigation point matching the icon position is acquired, where the predetermined area includes n navigation points, each navigation point is corresponding to one page, and n≥2.

The selected icon is moved to a page that is corresponding to the navigation point matching the icon position.

It should be understood that the singular form "one" ("a", "an", "the") used in the document is intended to also include a plural form unless the context clearly supports an otherwise case. It should also be understood that "and/or" used herein indicates that any or all possible combinations of one or more associated listed items are included.

The foregoing serial numbers in the embodiments of the present disclosure are merely for description, but do not represent merits or demerits of the embodiments.

A person of ordinary skill in the art may understand that all or a part of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method, applied to a terminal with a display interface, comprising:
   detecting a selection of an icon at a first position of a first page, wherein the terminal comprises a plurality of pages including the first page and a second page, each page of the plurality of pages comprising one or more icons corresponding to one or more applications;
   acquiring an icon position of the selected icon on the display interface;
   displaying the icon and n navigation points in a predetermined effect when the icon is moved to a predetermined area comprising scaling, for display, on a distance between two navigation points closest to the icon position according to a width of the icon, the predetermined area comprising the n navigation points, each navigation point corresponding to one page of the plurality of pages, and the predetermined effect is a distance between two neighboring navigation points that is negatively correlated to a proximity between the two neighboring navigation points and the icon position, and a distance between two navigation points closest to the icon position is greater than a width of the icon;
   determining, according to the icon position, a navigation point matching the icon position when the icon is in a predetermined area; and
   moving the icon to the second page corresponding to the navigation point matching the icon position.

2. The method of claim 1, wherein determining, according to the icon position, the navigation point matching the icon position comprises:
   calculating projection distances between the navigation points and the icon position on a straight line when the n navigation points are arranged along a straight line, a projection distance between a $i_{th}$ navigation point and the icon position on the straight line being li=|xi−xt|, xi representing projection coordinates of the $i_{th}$ navigation point on the straight line, xt representing projection coordinates of the icon position on the straight line, and i being between 1 and n including 1 and n; and
   selecting a navigation point with a smallest projection distance from the icon position on the straight line as the navigation point matching the icon position.

3. The method of claim 1, further comprising:
   scaling up the distance between two neighboring navigation points among the n navigation points when the icon is selected; and
   displaying the n navigation points with the distance] scaled up.

4. The method of claim 1, wherein displaying the icon and the n navigation points in the predetermined effect further comprises performing scaling, for display, on the width of the icon according to the distance between the two navigation points closest to the icon position.

5. The method of claim 1, wherein performing scaling, for display, on the distance between the two navigation points closest to the icon position according to the width of the icon comprises updating coordinates of each navigation point by using a predetermined algorithm.

6. The method of claim 5, wherein updating the coordinates of each navigation point by using the predetermined algorithm comprises:
   acquiring a difference for each navigation point, between projection coordinates of the navigation point and the icon position on a straight line when the n navigation points are arranged along a straight line, a difference between projection coordinates of a it navigation point and the icon position on the straight line being di=xi−xt, xi representing a projection coordinate of the $i_{th}$ navigation point on the straight line, xt representing a projection coordinate of the icon position on the straight line, and i being between 1 and n including 1 and n;
   calculating a first percentage value corresponding to the navigation point, a first percentage value corresponding to the $i_{th}$ navigation point being Pi=di^c, c being a preset constant, and 1 being between 0 and c excluding 0 and c; and
   updating a projection coordinate of the navigation point on the straight line according to the first percentage value, updated projection coordinate of the $i_{th}$ navigation point on the straight line being $$X_i = x_t + \frac{L}{|P_1| + |P_n|} \times P_i,$$

L being a preset constant, and L being larger than 0.

7. The method of claim 5, wherein updating the coordinates of each navigation point by using the predetermined algorithm comprises:
  calculating a second percentage value for each navigation point corresponding to the navigation point when the n navigation points are arranged along a straight line, a second percentage value corresponding to a $i_{th}$ navigation point being $f(i)=f(t) \times q^{|i-t|}$, a $t_{th}$ navigation point referring to one of the two navigation points closest to the icon position and a first navigation point, i being between 1 and n including 1 and n, t being between 1 and n−1 including 1 and n−1, q being a preset constant, and q being between 0 and 1 excluding 0 and 1; and
  updating projection coordinates of the navigation point on the straight line according to the second percentage value, updated projection coordinates of the $i_{th}$ navigation point on the straight line being $$X_i = x_0 + \sum_{i=1}^{i-1} f(i) \times \frac{L}{\sum_{i=1}^{n-1} f(i)},$$

L being a first preset constant, wherein L is larger than 0, wherein x0 is a second preset constant, and x0 is no less than 0.

8. The method of claim 5, wherein updating the coordinates of each navigation point by using the predetermined algorithm comprises:
  scaling a distance b between two navigation points closest to the icon position to w according to a width k of the icon when the n navigation points are arranged along a straight line, w being larger than k, b being larger than 0, the two navigation points closest to the icon position being a $t_{th}$ navigation point and a $(t+1)_{th}$ navigation point, and t being between 1 and n−1 including 1 and n−1;
  calculating a distance for the $i_{th}$ navigation point between a $i_{th}$ navigation point and a $(i+1)_{th}$ navigation point following an equation:

$D(i)=w+d \times |i-t|,$ $$\sum_{i=1}^{n-1} D(i) = L,$$

L being a first preset constant, L>0, i being between 1 and n−1 including 1 and n−1, d being a second preset constant, and d being less than 0; and
  updating a projection coordinate of each navigation point on the straight line according to the distance between the $i_{th}$ navigation point and the $(i+1)_{th}$ navigation point.

9. The method of claim 1, wherein moving the icon to the second page comprises:
  displaying the second page; and
  displaying the icon at a second position of the second page when the icon is released and a vacant position that is used to display the icon exists on the second page.

10. The method of claim 9, further comprising displaying the icon at the first position of the first page when no vacant position that is used to display the icon exists on the second page.

11. The method of claim 1, wherein before moving the icon to the second page, the method further comprises:
  acquiring a stay duration matching the navigation point corresponding to the second page, wherein stay duration refers to a duration that the icon position stays at one position;
  detecting whether the stay duration is greater than a predetermined threshold; and
  moving the icon to the second page when the stay duration is greater than the predetermined threshold.

12. An electronic device, wherein the electronic device comprises:
  a memory comprising instructions; and
  a processor coupled to the memory, the instructions executed by the processor causing the electronic device to be configured to:
    detect selection of an icon at a first position of a first page on a display interface, the electronic device comprising a plurality of pages including the first page and a second page, each of the plurality of pages comprising one or more icon corresponding to one or more applications;
    acquire an icon position of the selected icon on the display interface;
    display the icon and n navigation points in a predetermined effect when the icon is moved to a predetermined area, the electronic device configured to scale on a distance between two navigation points closest to the icon position according to a width of the icon, the predetermined area comprising the n navigation points, each navigation point corresponding to one page of the plurality of pages, and the predetermined effect is a distance between two neighboring navigation points that is negatively correlated to a proximity between the two neighboring navigation points and the icon position, and a distance between two navigation points closest to the icon position being greater than a width of the icon;
    determine, according to the icon position, a navigation point matching the icon position when the icon is in a predetermined area; and
    move the icon to the second page corresponding to the navigation point matching the icon position.

13. The electronic device of claim 12, wherein the instructions further cause the electronic device to be configured to:
  calculate projection distances between the navigation points and the icon position on a straight line when the n navigation points are arranged along the straight line, a projection distance between a $i_{th}$ navigation point and the icon position on the straight line being li=|xi−xt|, xi representing a projection coordinate of the $i_{th}$ navigation point on the straight line, xt representing a projection coordinate of the icon position on the straight line, and i being between 1 and n including 1 and n; and
  select a navigation point with a smallest projection distance from the icon position on the straight line as the navigation point matching the icon position.

14. The electronic device of claim 12, wherein the instructions further cause the electronic device to be configured to:
  scale up the distance between the two neighboring navigation points among the n navigation points when the icon is selected; and
  display the n navigation points according to the distance scaled up.

15. The electronic device of claim 12, wherein the instructions further cause the electronic device to be configured to display the icon after scaling is performed on the width of the icon according to the distance between the two navigation points closest to the icon position.

16. The electronic device of claim 12, wherein the instructions further cause the electronic device to be configured to update a coordinate of each navigation point by using a predetermined algorithm.

17. The electronic device of claim 16, wherein the instructions further cause the electronic device to be configured to:
acquire a difference for each navigation point between projection coordinates of the navigation point and the icon position on a straight line when the n navigation points are arranged along a straight line, a difference between projection coordinates of the $i_{th}$ navigation point and the icon position on the straight line being di=xi−xt, xi representing a projection coordinate of a $i_{th}$ navigation point on the straight line, xt representing a projection coordinate of the icon position on the straight line, and i being between 1 and n including 1 and n;
calculate a first percentage value corresponding to the navigation point, a first percentage value corresponding to the $i_{th}$ navigation point being Pi=di^c, c being a first preset constant, and 1 being between 0 and c excluding 0 and c; and
update a projection coordinate of the navigation point on the straight line according to the first percentage value, an updated projection coordinate of the $i_{th}$ navigation point on the straight line being $$X_i = x_t + \frac{L}{|P_1| + |P_n|} \times P_i,$$

L being a second preset constant, and L being larger than 0.

18. The electronic device of claim 16, wherein the instructions further cause the electronic device to be configured to:
calculate a second percentage value for each navigation point corresponding to the navigation point when the n navigation points are arranged along a straight line, a second percentage value corresponding to a $i_{th}$ navigation point being $f(i)=f(t) \times q^{|i-t|}$, a $t_{th}$ navigation point referring to one of the two navigation points closest to the icon position and a first navigation point, I being between 1 and n including 1 and n, t being between 1 and n−1 including 1 and n−1, and q being a third preset constant, and q being between 0 and 1 excluding 0 and 1; and
update a projection coordinate of the navigation point on the straight line according to the second percentage value, wherein updated projection coordinate of the $i_{th}$ navigation point on the straight line is $$X_i = x_0 + \sum_{i=1}^{i-1} f(i) \times \frac{L}{\sum_{i=1}^{n-1} f(i)},$$

L being a first preset constant, L being larger than 0, wherein x0 is a second preset constant, and x0 being no less than 0.

19. The electronic device of claim 16, wherein the instructions further cause the electronic device to be configured to:
scale a distance b between two navigation points closest to the icon position to w according to a width k of the icon when the n navigation points are arranged along a straight line, w being larger than k, b being larger than 0, the two navigation points closest to the icon position being a $t_{th}$ navigation point and a $(t+1)_{th}$ navigation point, and t being between 1 and n including 1 and n;
calculate a distance for a $i_{th}$ navigation point between the $i_{th}$ navigation point and a $(i+1)_{th}$ navigation point following an equation:

$$D(i)=w+d \times |i-t|,$$

$$\sum_{i=1}^{n-1} D(i) = L,$$

L being a first preset constant, L being larger than 0, i being between 1 and n−1 including 1 and n−1, d being a second preset constant, and d being less than 0; and
update a projection coordinate of each navigation point on the straight line according to the distance that is between the $i_{th}$ navigation point and the $(i+1)_{th}$ navigation point.

20. The electronic device of claim 12, wherein the instructions further cause the electronic device to be configured to:
display the second page; and
display the icon at a second position of the second page when the icon is released and a vacant position that is used to display the icon exists on the second page.

21. The electronic device of claim 12, wherein the instructions further cause the electronic device to be configured to displaying the icon at the first position of the first page when no vacant position is used to display the icon that exists on the second page.

22. The electronic device of claim 12, wherein the instructions further cause the electronic device to be configured to:
acquire a stay duration matching the navigation point corresponding to the second page, the stay duration referring to a duration that the icon position stays at one position;
detect whether the stay duration is greater than a predetermined threshold; and
move the icon to the second page when the stay duration is greater than the predetermined threshold.

23. An electronic device, comprising:
a memory comprising instructions; and
a processor coupled to the memory, the instructions executed by the processor causing the electronic device to be configured to:
detect a selection of an icon displayed at a first position of a first page on a display interface, the electronic device comprising a plurality of pages including the first page and a second page, and each page of the plurality of pages comprising one or more icons corresponding to one or more applications;
acquire an icon position of the icon selected on the display interface;
when the icon is moved to a predetermined area, display the icon and n navigation points in a predetermined effect by scaling on a width of the icon according to a distance between two navigation points closest to the icon position, the predetermined area comprising the n navigation points, and each navigation point corresponds to one page of the plurality of pages, and the predetermined effect is a distance between two neighboring navigation points that is negatively correlated to a proximity between the two neighboring navigation points and the icon position, and a distance between two navigation points closest to the icon position being greater than a width of the icon;

determine, according to the icon position, a navigation point matching the icon position when the icon is in a predetermined area; and move the icon to the second page corresponding to the determined navigation point matching the icon position.

24. The electronic device of claim 23, wherein the instructions cause the electronic device to be configured to:

display the second page; and display the icon at a second position of the second page when the icon is released and a vacant position that is used to display the icon exists on the second page; and display the icon at the first position of the first page when the icon is released and no vacant position that is used to display the icon exists on the second page.

* * * * *